US008335010B2

(12) United States Patent
Morimoto et al.

(10) Patent No.: US 8,335,010 B2
(45) Date of Patent: Dec. 18, 2012

(54) IMAGE PROCESSING APPARATUS, IMAGE FORMING APPARATUS, IMAGE PROCESSING METHOD, AND RECORDING MEDIUM

(75) Inventors: Atsuhisa Morimoto, Osaka (JP); Yohsuke Konishi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 635 days.

(21) Appl. No.: 12/618,286

(22) Filed: Nov. 13, 2009

(65) Prior Publication Data
US 2010/0123928 A1 May 20, 2010

(30) Foreign Application Priority Data

Nov. 17, 2008 (JP) .................................. 2008-293711

(51) Int. Cl.
*G06K 15/00* (2006.01)
*G06F 3/12* (2006.01)
(52) U.S. Cl. ......... 358/1.18; 358/1.15; 358/1.1; 358/1.2
(58) Field of Classification Search .................. None
See application file for complete search history.

(56) References Cited

U.S. PATENT DOCUMENTS

| 2007/0157084 | A1 | 7/2007 | Yano et al. | |
|---|---|---|---|---|
| 2010/0103481 | A1* | 4/2010 | Morimoto et al. | 358/474 |
| 2010/0316295 | A1* | 12/2010 | Morimoto | 382/182 |

FOREIGN PATENT DOCUMENTS

| JP | 6-189083 A | 7/1994 |
|---|---|---|
| JP | 2004-56782 A | 2/2004 |
| JP | 2005-269524 A | 9/2005 |
| JP | 2007-200280 A | 8/2007 |

OTHER PUBLICATIONS

"Viewer with which a user can view images by touch operation (iPhone, for example)/S2V", [OnLine], Willcom Fansite, Search Date: May 23, 2008, Internet <URL:http://www.willcom-fan.com/wzero3/entries/memn0ck/000431/>.

* cited by examiner

*Primary Examiner* — Dov Popovici
(74) *Attorney, Agent, or Firm* — Birch, Stewart, Kolasch & Birch, LLP

(57) ABSTRACT

An image processing apparatus includes: a reliability determining section which determines, with respect to each of the plurality of document images, reliability of coincidences of respective predetermined directions with a first reference direction, the first reference direction being a predetermined direction which points on a basis of an upward direction of or a downward direction of the information image; and a display control section (i) which divides the plurality of document images into groups so that document images, having a same direction whose reliability value is the highest, belong to a same group, and (ii) which causes a display device to display preview images for the respective groups, each of the preview images indicating at least one document image in each of the groups. In a case where one group contains a plurality of document images, a preview image containing the plurality of document images is displayed.

17 Claims, 25 Drawing Sheets

FIG. 5(a)

| ORDER OF RELIABILITY VALUE | DENSITY (COLOR) OF INSTRUCTION REGION |
|---|---|
| RANKED FIRST | (R,G,B) = (R1, 0, 127) |
| RANKED SECOND | (R,G,B) = (R2, 0, 127) |
| RANKED THIRD | (R,G,B) = (R3, 0, 127) |
| RANKED FOURTH | (R,G,B) = (R4, 0, 127) |

FIG. 5(b)

| DENSITY (COLOR) ACCORDING TO ORDER OF RELIABILITY VALUE | |
|---|---|
| R1 | 20 |
| R2 | 75 |
| R3 | 140 |
| R4 | 200 |

FIG. 5(c)

| DENSITY (COLOR) ACCORDING TO RELIABILITY VALUE | |
|---|---|
| R1 | 255 −(LARGEST RELIABILITY VALUE/LARGEST RELIABILITY VALUE)∗ 255 |
| R2 | 255 −(SECOND LARGEST RELIABILITY VALUE/LARGEST RELIABILITY VALUE)∗ 255 |
| R3 | 255 −(THIRD LARGEST RELIABILITY VALUE/LARGEST RELIABILITY VALUE)∗ 255 |
| R4 | 255 −(LOWEST RELIABILITY VALUE/LARGEST RELIABILITY VALUE)∗ 255 |

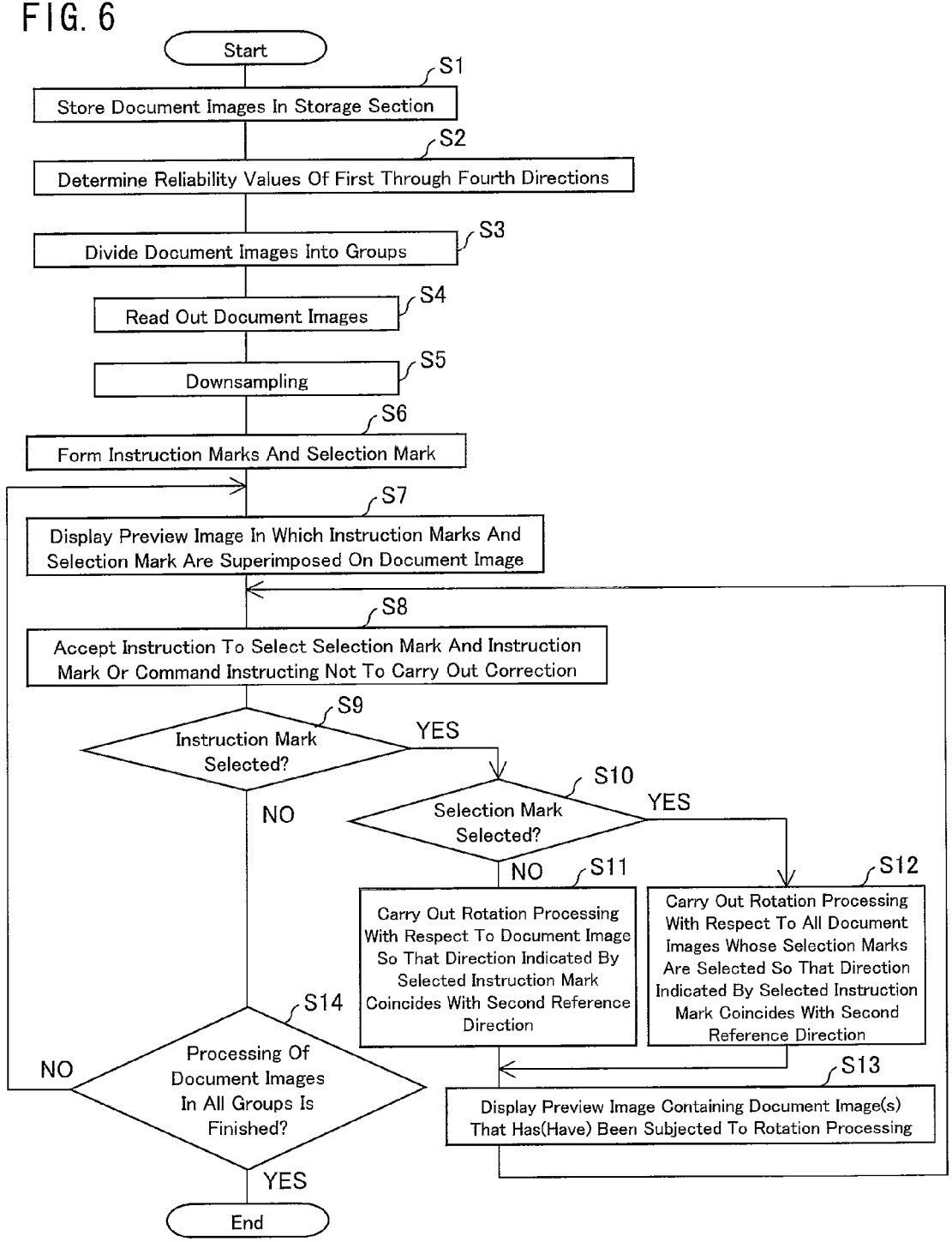

FIG. 8(a)

| ORDER OF RELIABILITY VALUE | SIZE OF INSTRUCTION MARK |
|---|---|
| RANKED FIRST | REFERENCE VALUE OF SIZE * M1 |
| RANKED SECOND | REFERENCE VALUE OF SIZE * M2 |
| RANKED THIRD | REFERENCE VALUE OF SIZE * M3 |
| RANKED FOURTH | REFERENCE VALUE OF SIZE * M4 |

FIG. 8(b)

| MAGNIFICATION RATIO ACCORDING TO ORDER OF RELIABILITY VALUE | |
|---|---|
| M1 | 4/4 |
| M2 | 3/4 |
| M3 | 2/4 |
| M4 | 1/4 |

FIG. 8(c)

| MAGNIFICATION RATIO ACCORDING TO ORDER OF RELIABILITY VALUE | |
|---|---|
| M1 | LARGEST RELIABILITY VALUE/LARGEST RELIABILITY VALUE |
| M2 | SECOND LARGEST RELIABILITY VALUE/LARGEST RELIABILITY VALUE |
| M3 | THIRD LARGEST RELIABILITY VALUE/LARGEST RELIABILITY VALUE |
| M4 | LOWEST RELIABILITY VALUE/LARGEST RELIABILITY VALUE |

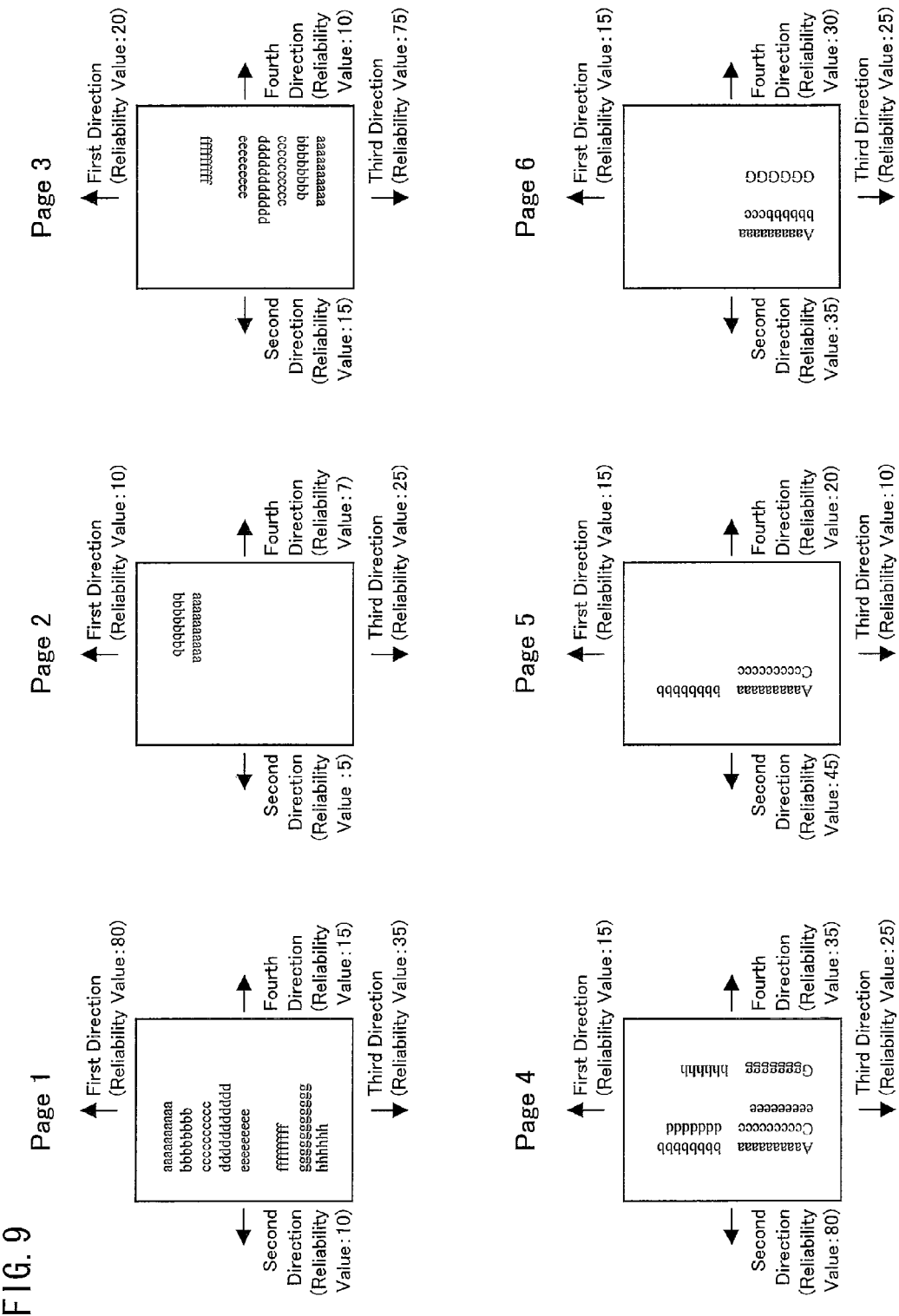

FIG. 12
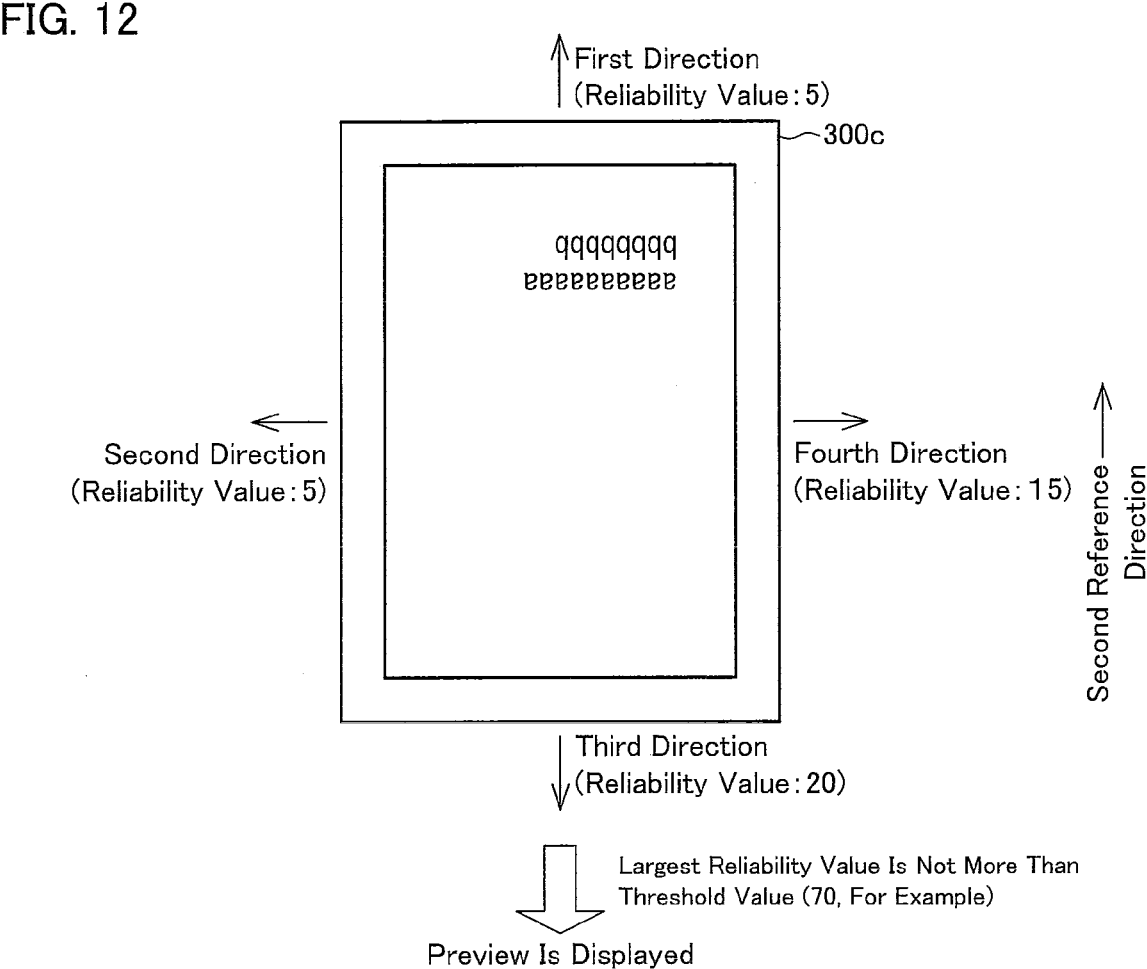
Preview Is Displayed
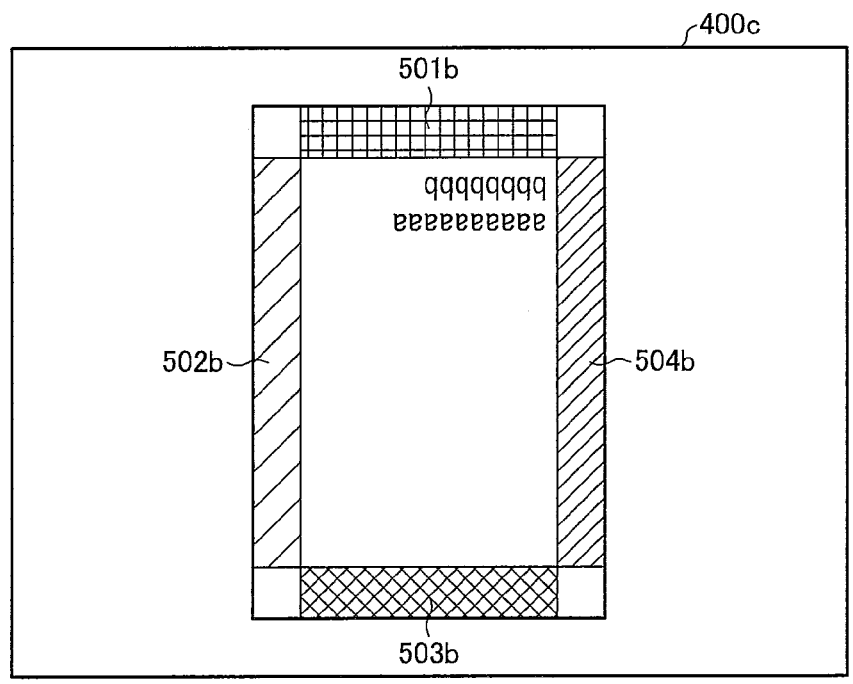

FIG. 15
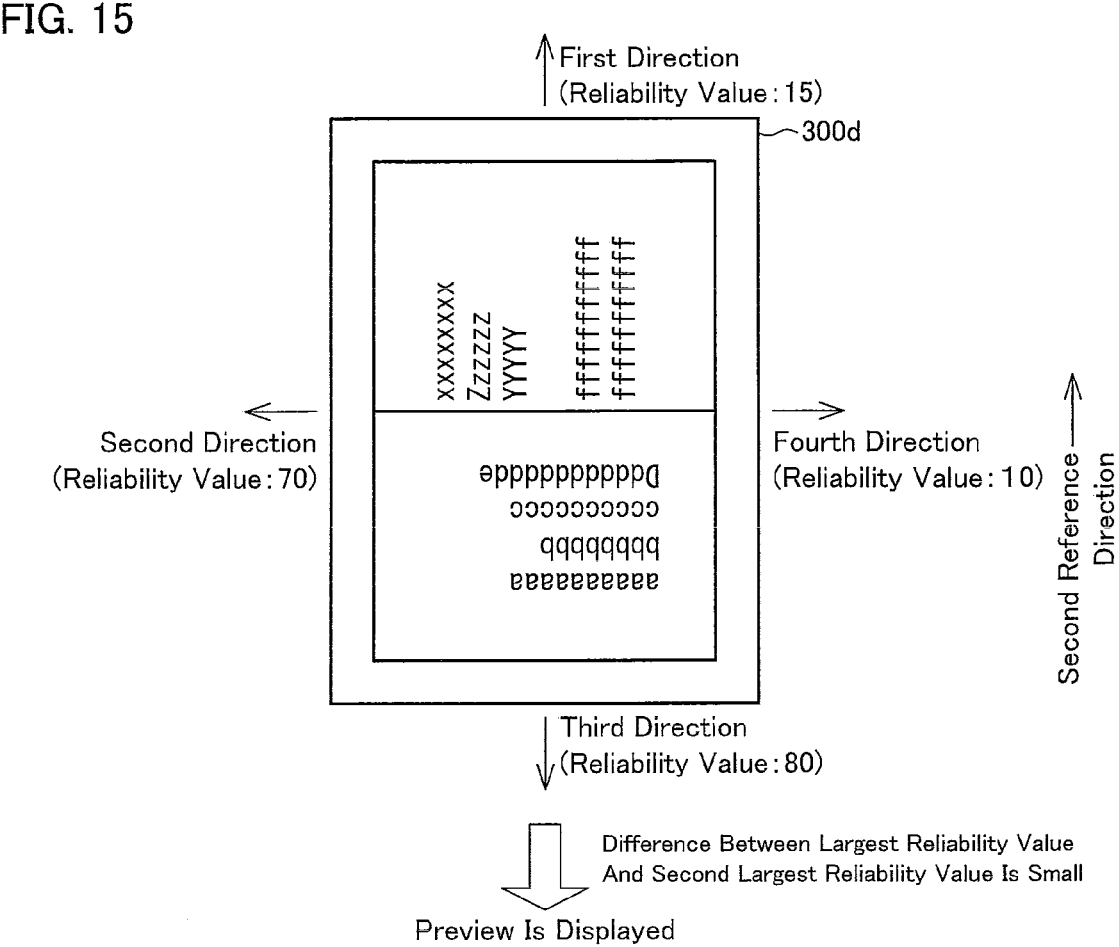
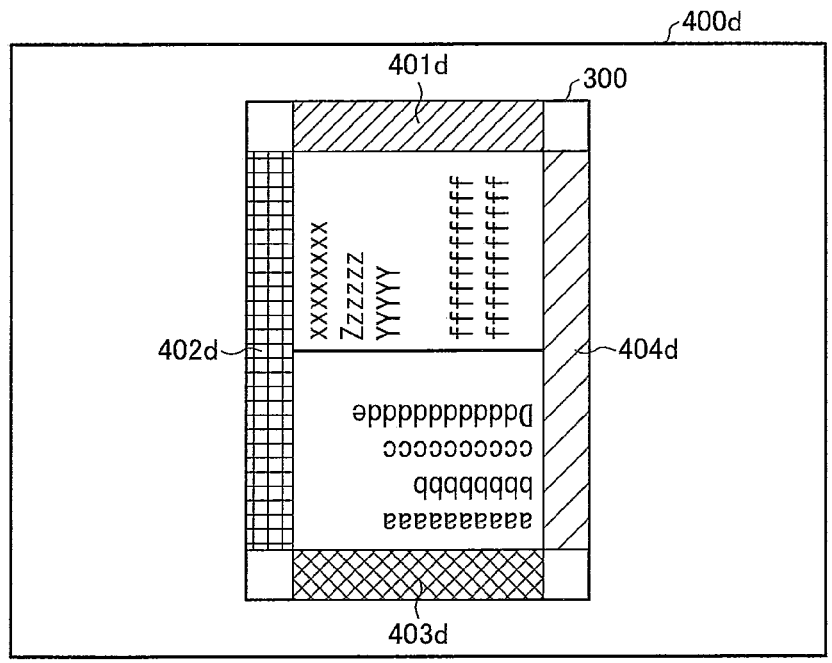

FIG. 17
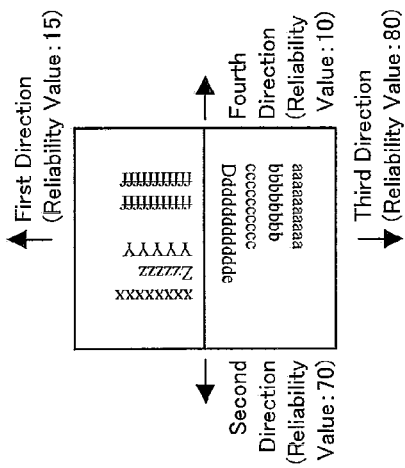
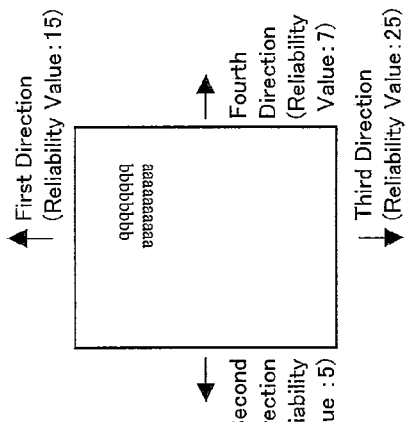
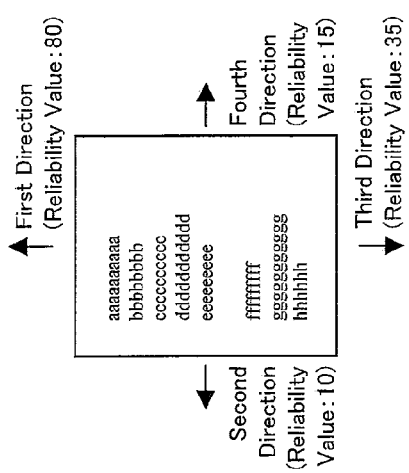
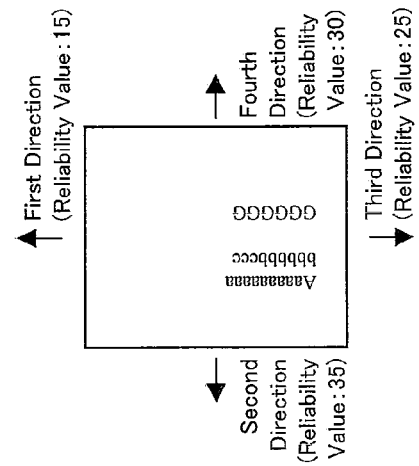
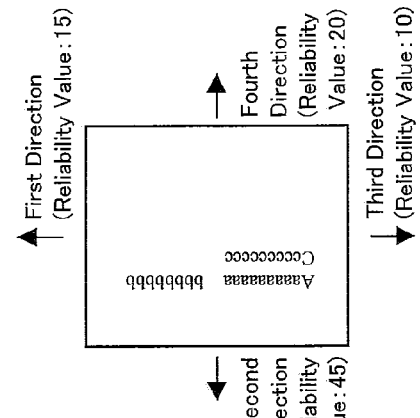
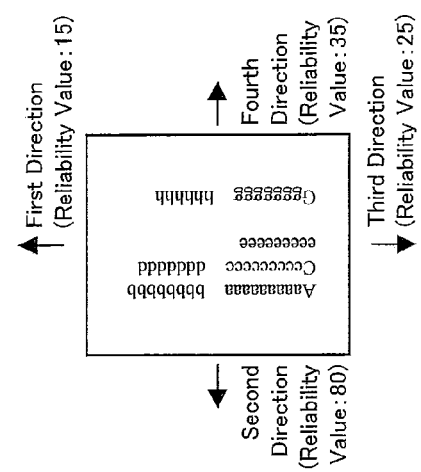

IMAGE PROCESSING APPARATUS, IMAGE FORMING APPARATUS, IMAGE PROCESSING METHOD, AND RECORDING MEDIUM

This Nonprovisional application claims priority under 35 U.S.C. §119(a) on Patent Application No. 2008-293711 filed in Japan on Nov. 17, 2008, the entire contents of which are hereby incorporated by reference.

TECHNICAL FIELD

The present invention relates to an image processing apparatus for processing image data for a thumbnail and image data for a preview.

BACKGROUND ART

Before a scanned image is printed out, an image forming apparatus, such as a copying machine and a multifunction printer, often displays, in accordance with a processing condition set by a user, a preview of a document image shown in the scanned image that has been image-processed. In a case where a plurality of documents are read, each of the documents may be print-previewed one by one, or the plurality of documents may be print-previewed collectively. The processing condition includes: a sort of a document; a print density; a ratio in enlarging/reducing processing; single-sided printing or two-sided printing; a binding margin size; and the like.

Patent Literature 1 discloses an image forming apparatus in which a preview of a document image is displayed so that a user can (i) check the document image and (ii) input a command to carry out rotation processing and a rotation angle. The image forming apparatus displays a checking icon for accepting a command to carry out rotation processing and setting of a rotation angle. A user inputs a command to carry out rotation processing and a rotation angle by clicking the checking icon. The rotation angle can be set to 0°, 90°, 180°, and 270°. According to the image forming apparatus disclosed in Patent Literature 1, a rotation direction is a clockwise direction. Specifically, if a user wants to rotate an image (scanned image), in which a document is shown, at a right angle in a clockwise direction, the rotation angle is set to 90°, and if the user does not want to rotate the image, the rotation angle is set to 0°.

Patent Literature 1 teaches that when the image forming apparatus receives a command to carry out the rotation processing from a user, the image forming apparatus carries out the rotation processing with respect to an image (scanned image) in which a document is shown, and then again displays a preview of the document image after the rotation processing. Further, Patent Literature 1 teaches that the image forming apparatus displays a list of a plurality of document images, and carries out the rotation processing collectively with respect to the plurality of document images. Furthermore, Patent Literature 1 teaches that the image forming apparatus automatically determines a page orientation of a document image, and then displays a preview of the document image that has been rotated based on the page orientation automatically determined.

Non Patent Literature 1 discloses a technique in which an image displayed on a display is rotated by intuitive operation. Specifically, if a user strokes the display, which is constituted by a touch panel, in a vertical direction with his finger etc, an image displayed on the display is rotated.

Citation List
Patent Literature 1
Japanese Patent Application Publication, Tokukai, No. 2007-200280 A (Publication Date: Aug. 9, 2007)
Patent Literature 2
Japanese Patent Application Publication, Tokukaihei, No. 6-189083 A (Publication Date: Jul. 8, 1994)
Non Patent Literature 1
"Viewer with which a user can view images by touch operation (iPhone, for example)/S2V", [On Line], Wilcom Fansite, Search Date: May 23, 2008, Internet <URL:http://www.willcom-fan.com/wzero3/entries/memn0ck/000431/>

SUMMARY OF INVENTION

Technical Problem
However, the conventional arrangement causes the following problems.

The image forming apparatus disclosed in Patent Literature 1 is simply arranged such that settable rotation angles are displayed on a monitor along with preview of a document image. With the arrangement, there are cases where a user has difficulty in judging the page orientation of the document image just by looking at the monitor. For example, in a case where the monitor is small or in a case where the size of the document image is small, the user has difficulty in recognizing orientation of characters shown in the document image, and has therefore difficulty in recognizing the page orientation of the document image. In a case where a plurality of documents images are collectively displayed, each of the plurality of document images becomes smaller in size, and therefore it becomes more difficult to judge page orientation of the document image. Further, in a case where a plurality of document image which are collectively displayed have respective different page orientation, the plurality of document image must be rotated in respective different rotation directions. Therefore, a user cannot give an instruction to collectively rotate the plurality of document image.

According to the arrangement disclosed in Non Patent Literature 1, in a case where a plurality of document images are subjected to rotation processing, a user must give an instruction to carry out rotation processing with respect to each of the plurality of document images. This causes a burden on the user.

The present invention was attained in view of the above problems, and an object of the present invention is to realize an image processing apparatus in which a user can easily check page orientation of each of a plurality of document images.

Solution to Problem
An image processing apparatus of the present invention for processing a plurality of document images contained in inputted image data, each of the plurality of document images containing an information image which provides a user with information, said image processing apparatus, includes: a reliability determining section which determines, with respect to each of the plurality of document images, reliability of coincidences of respective predetermined directions with a first reference direction, the first reference direction being a predetermined direction which points on a basis of an upward direction of or a downward direction of the information image; and a display control section (i) which divides the plurality of document images into groups so that document images, having a same direction whose reliability value is the highest, belong to a same group, and (ii) which causes a display device to display preview images for the respective groups, each of the preview images indicating at least one document image in each of the groups.

Advantageous Effects of Invention

According to an image processing apparatus of the present invention, a user can easily check page orientation of a plurality of document images contained in inputted image data.

For a fuller understanding of the nature and advantages of the invention, reference should be made to the ensuing detailed description taken in conjunction with the accompanying drawings.

BRIEF DESCRIPTION OF DRAWINGS

FIG. 1 is a block diagram showing one embodiment of an image processing apparatus of the present invention.

FIG. 2(a) is a view showing a document image read out from a document.

FIG. 2(b) is a view showing a preview image created based on the document image of FIG. 2(a).

FIG. 3(a) is a view showing reliability values of respective first through fourth directions of a document image showing an information image in which (i) characters facing a first direction and (ii) characters facing a second direction are mixed.

FIG. 3(b) is a view showing reliability values of the respective first through fourth directions of a document image showing an information image in which only characters facing the first direction is shown.

FIG. 3(c) is a view showing reliability values of the respective first through fourth direction of a document image showing an information image which contain a small number of characters.

FIG. 4 is a view for explaining a method for determining positions of respective instruction marks and a position of a selection mark.

FIG. 5(a)

FIG. 5(a) is a table showing how the order of the reliability value is associated with signs indicating respective density values.

FIG. 5(b)

FIG. 5(b) is a table showing how the signs shown in FIG. 5(a) are associated with the density values.

FIG. 5(c)

FIG. 5(c) is a table showing how the signs shown in FIG. 5(a) are associated with expressions concerning density.

FIG. 6

FIG. 6 is a flow chart showing a procedure of processing carried out in the Embodiment 1.

FIG. 7 is a view showing a preview image which is created based on the document image of FIG. 2(a) and in which instruction marks having respective different sizes are formed.

FIG. 8(a)

FIG. 8(a) is a table showing how the order of the reliability value is associated with expressions for calculating sizes of the instruction marks.

FIG. 8(b)

FIG. 8(b) is a table showing how signs included in the expressions of FIG. 8(a) are associated with magnification ratio.

FIG. 8(c)

FIG. 8(c) is a table showing how the signs shown in FIG. 8(a) are associated with expressions concerning the magnification ratio.

FIG. 9

FIG. 9 is a view showing reliability values of respective directions in each of six document images (document images of page 1 through page 6).

FIG. 10 is a view showing preview images of respective groups each containing a document image(s), the preview images being displayed on a display device.

FIG. 11 is a view for explaining processing of not displaying a preview image in a case where the largest reliability value is larger than a threshold value.

FIG. 12

FIG. 12 is a view for explaining processing of displaying a preview image in a case where the largest reliability value is not more than a threshold value.

FIG. 13 is a view showing (i) a preview image of a group in which the first direction has the largest reliability value, (ii) a preview image of a group in which the second direction has the largest reliability value, (iii) a preview image of a group in which the third direction has the largest reliability value, and (iv) a preview image of a group in which the fourth direction has the largest reliability value, in the Embodiment 2.

FIG. 14 is a flow chart showing a flow of processing carried out in the Embodiment 2.

FIG. 15

FIG. 15 is a view for explaining processing of displaying a preview image in a case where a difference between the largest reliability value and the second largest reliability value is not more than a threshold value.

FIG. 16 is a view for explaining processing of not displaying a preview image in a case where a difference between the largest reliability value and the second largest reliability value is larger than a threshold value.

FIG. 17

FIG. 17 is a view showing reliability values of respective directions in each of six document images (document images of page 1 through page 6).

FIG. 18 is a view showing (i) a preview image of a group in which the first direction has the largest reliability value, (ii) a preview image of a group in which the second direction has the largest reliability value, (iii) a preview image of a group in which the third direction has the largest reliability value, and (iv) a preview image of a group in which the fourth direction has the largest reliability value, in the Embodiment 3.

FIG. 19 is a flow chart showing a flow of processing carried out in the Embodiment 3.

FIG. 20 is a flow chart showing a flow of processing carried out in the Embodiment 4.

FIG. 21 is a view showing a preview image that has been subjected to provisional rotation processing.

FIG. 22 is a flow chart showing a flow of processing carried out in the Embodiment 5.

FIG. 23 is a block diagram showing one embodiment of an image forming apparatus of the present invention.

FIG. 24 is a block diagram showing one embodiment of an image reading apparatus of the present invention.

FIG. 25 is a view showing an arrangement of an image input apparatus shown in FIGS. 23 and 24.

DESCRIPTION OF EMBODIMENTS

[Embodiment 1]

Figure 1:
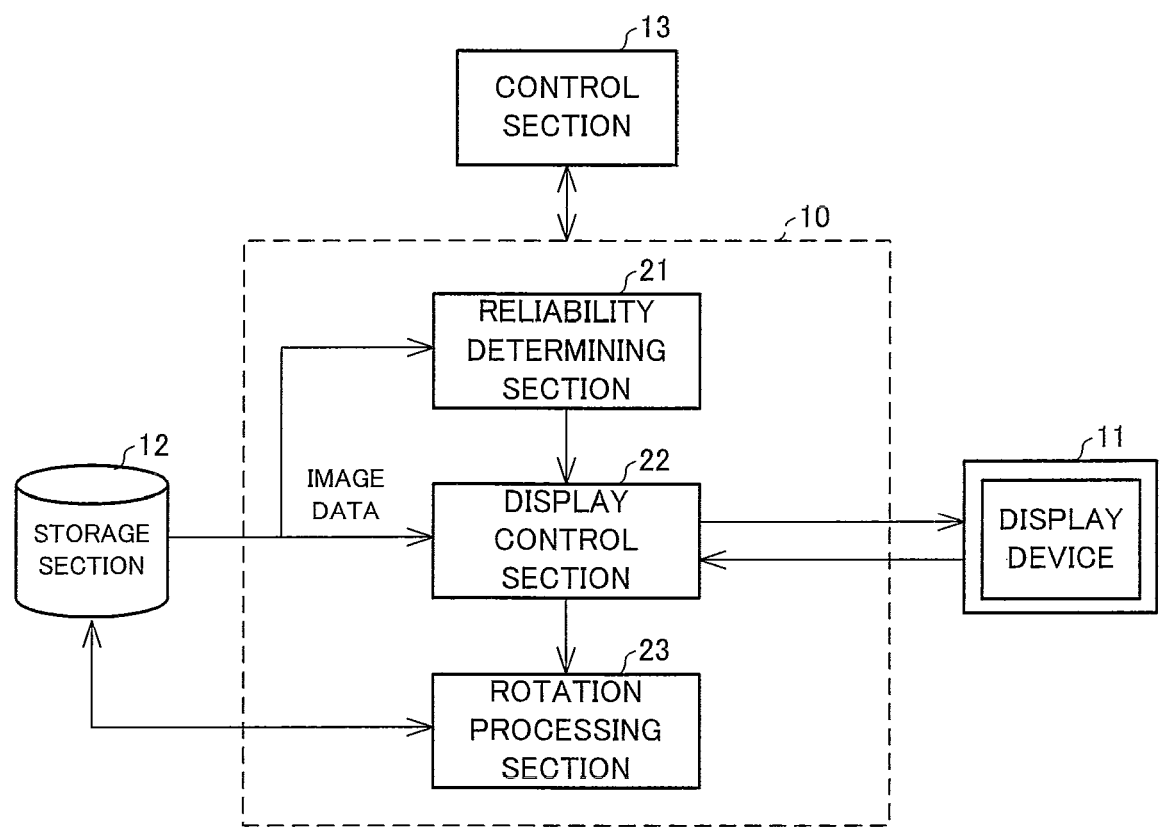
FIG. 1

One embodiment of the present invention is described below with reference to the attached drawings. FIG. 1 is a block diagram schematically illustrating an arrangement of an image processing apparatus 10 of the present embodiment.

According to the present embodiment, the image processing apparatus 10 is provided in an image forming apparatus (a copying machine or a multifunction printer) including an image input apparatus (CCD line sensor) which scans a document so as to obtain an image. A document image read out from a document by the image input apparatus is inputted, as image data, to the image processing apparatus 10. The image processing apparatus 10 carries out image processing with respect to the image data thus inputted (inputted image data). In a case where a plurality of documents are scanned, the image data includes a plurality of images. Note that, in this specification, an image included in inputted image data is referred to as a document image. The following description deals with a case where the image input apparatus scans a rectangular-shaped document on which an information image which provides a user with information is formed. Therefore, in the following description, a document image included in image data is a rectangular-shaped image including the information image which is formed on the document. The information image refers to an image which contains, for example, characters, and whose direction in which the image is formed is important for a user.

As shown in FIG. 1, the image processing apparatus 10 is connected to a display device 11, a storage section 12, and a control section 13.

The display device 11 is image display means which constitutes an operation panel of the image forming apparatus. The display device 11 provides a user with various kinds of information concerning the image forming apparatus. The display device 11 is covered with a touch panel, and therefore an image displayed on the display device 11 also serves as a graphical user interface. Note that general image display means such as a liquid crystal display can be used as the display device 11.

The storage section 12 is data storage means provided in the image forming apparatus. A general hard disc apparatus can be used as the storage section 12, for example.

The control section 13 controls operations of the image processing apparatus 10, the storage section 12, display device 11, and the like. Further, the control section 13 also controls: data communication within the image processing apparatus 10; data communication between the image processing apparatus 10 and the storage section 12; and data communication between the image processing apparatus 10 and the display device 11. Note that the control section 13 is a computer constituted by a CPU, a RAM, a ROM, and the like.

In the arrangement in FIG. 1, image data inputted from the image input apparatus is stored in the storage section 12. The image processing apparatus 10 reads out image data from the storage section 12, and then carries out image processing with respect to the image data. The image data that has been subjected to the image processing is stored in the storage section 12 again. The image processing apparatus 10 creates a preview image based on the image data, and causes the display device 11 to display the preview image.

The following description deals with details of an internal arrangement of the image processing apparatus 10. As shown in FIG. 1, the image processing apparatus 10 includes a reliability determining section 21, a display control section 22, and a rotation processing section 23.

(Reliability Determining Section 21)

The reliability determining section 21 is a block which, after image data of a document image scanned by the image input apparatus is created, and is then stored in the storage section 12, (i) reads out the image data from the storage section 12, and (ii) determines reliability (likelihood, confidence) of coincidences of respective first through fourth directions with a first reference direction (later described) in the document image contained in the image data. More specifically, according to the present embodiment, the reliability determining section 21 outputs reliability values (likelihood values, confidence values) of the respective first through fourth directions. Note that the higher the reliability is, the larger the reliability value (likelihood value, confidence value) becomes.

Figure 2A:
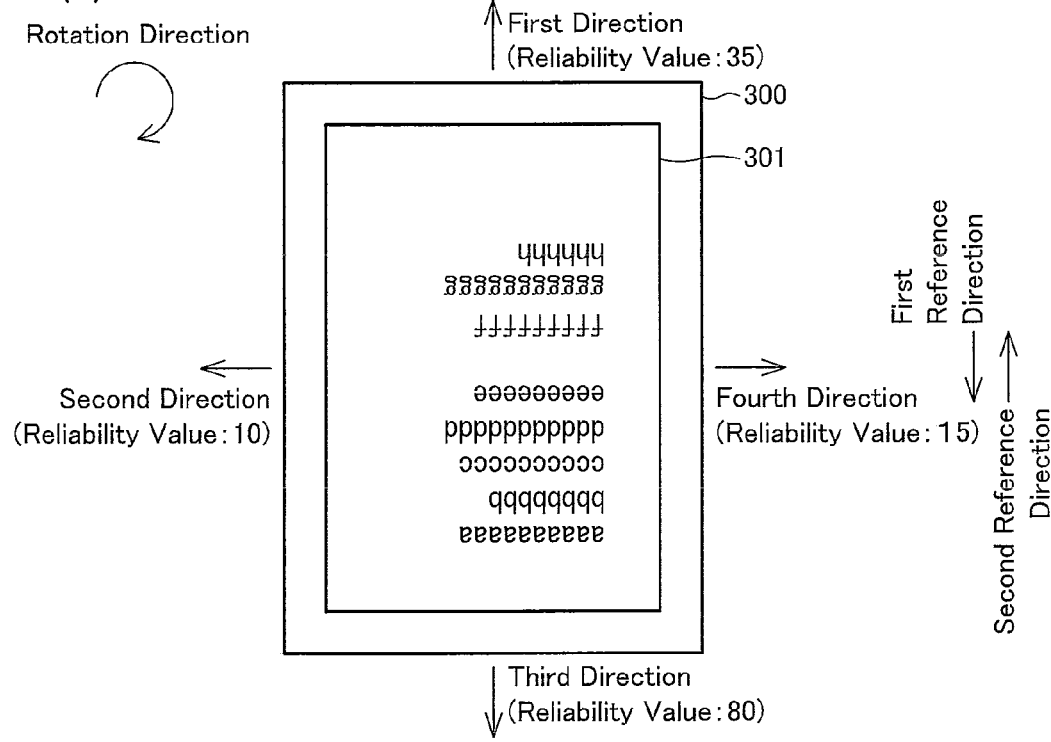
FIG. 2(a)
Figure 2B:
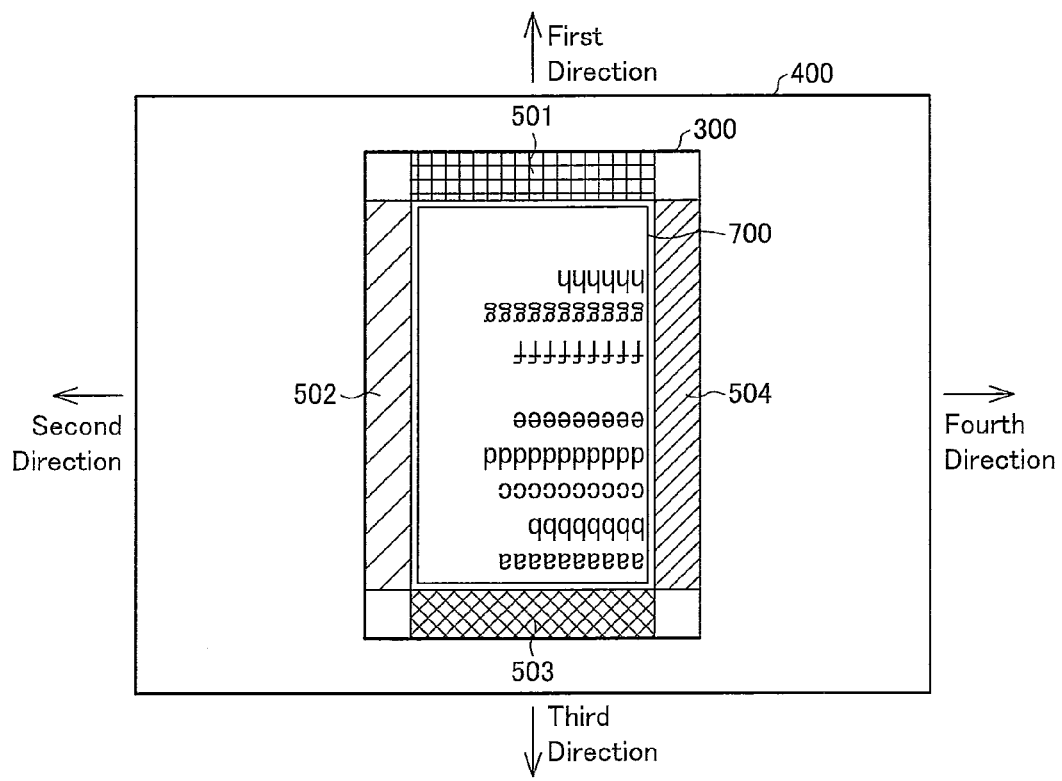
FIG. 2(b)

FIG. 2(a) shows a document image 300 scanned from a document placed on a scanner platen, and FIG. 2(b) shows a preview image 400 created based on the document image 300 of FIG. 2(a). The first reference direction refers to an upward direction of an information image (image formed on a document) 301 shown in the document image 300 (direction pointing from a lower side of the information image 301 toward an upper side of the information image 301: direction pointing from an upper side of FIG. 2(a) toward a lower side of FIG. 2(a)) (see FIG. 2(a)). It follows that the upward direction of the information image 301 coincides with an upward direction of the document image 300 obtained after the document image 300 is rotated so as to have a direction desirable for a user who carries out processing (e.g. displaying or printing) with respect to the document image 300. Further, an upward direction of information image (e.g. characters) contained in each document image may differ from document image to document image. Consequently, the first reference direction may differ from document image to document image.

In the present embodiment, an upward direction of the document image 300 is referred to as a second reference direction (see FIGS. 2(a) and 2(b)). Note that the second reference direction always refers to an upward direction of the document image 300 even if the document image 300 is rotated. Note also that the second reference direction is the same irrespective of document image.

In an example of FIGS. 2(a) and 2(b), the document image 300 is scanned from the document so that the first reference direction is reverse to the second reference direction.

The first through fourth directions in the document image 300 are respective directions pointing from a center of the information image 301 shown in the document image 300 toward respective sides of the information image 301, and are perpendicular to the respective sides of the information image 301 (see FIGS. 2(a) and 2(b)). Here, the first direction is a direction which coincides with the second reference direction pointing before the document image 300 is subjected to rotation processing by the rotation processing section 23 (later described) (see FIGS. 2(a) and 2(b)).

The second direction is a direction perpendicular to the second reference direction pointing before the document image 300 is subjected to rotation processing by the rotation processing section 23, and coincides with the second reference direction in a case where the document image 300 is subjected to rotation processing by the rotation processing section 23 so as to be rotated by 90° (rotated by 90° in a clockwise direction) (see FIGS. 2(*a*) and 2(*b*)). The third direction is a direction reverse to the second reference direction before the document image 300 is subjected to rotation processing by the rotation processing section 23, and coincides with the second reference direction in a case where the document image 300 is subjected to rotation processing of the rotation processing section 23 so as to be rotated by 180° (see FIGS. 2(*a*) and 2(*b*)). The fourth direction is a direction perpendicular to the second reference direction before the document image 300 is subjected to rotation processing by the rotation processing section 23, and coincides with the second reference direction in a case where the document image 300 is subjected to rotation processing of the rotation processing section 23 so as to be rotated by 270° (see FIGS. 2(*a*) and 2(*b*)). Here, the rotation direction is a clockwise direction.

In an example of FIGS. 2(*a*) and 2(*b*), the reliability determining section 21 determines reliability values of the respective first through fourth directions. In the example of FIGS. 2(*a*) and 2(*b*) in which the first reference direction is highly likely to coincide with the third direction, a reliability value of the first direction is 35, a reliability value of the second direction is 10, a reliability value of the third direction is 80, and a reliability value of the fourth direction is 15, for example.

In the present embodiment, the reliability values are determined based on the following procedures (1) through (8). Note that the following procedures are based on the procedures disclosed in Patent Literature 2. Note that other known arts for determining an upward direction of an image can be utilized in determining reliability values. It follows that the reliability values vary depending on a reliability value determining method to be employed.

(1) First, based on an OCR (Optical Character Recognition) technique, the reliability determining section 21 recognizes character images of the information image 301 shown in the document image 300, and develops a pattern for each of the character images.

(2) Next, the reliability determining section 21 compares inputted character patterns obtained from the information image in the document image 300 with stored character patterns which has been included in a database in advance (matching). In this comparison, an inputted character pattern and stored character patterns are caused to overlap each other so as to determine whether or not the inputted character pattern and one of the stored character patterns are identical with each other in color (black and white). If all of the pixels of the inputted character pattern and all of the pixels of one of the stored character patterns are identical with each other in color (black and white), the inputted character pattern and the stored character pattern are determined as being "Identical".

(3) Further, if the database has no stored character pattern that is identical with the inputted character pattern in color (black and white) in all pixels, a stored character pattern having the largest number of pixels that are identical with those of the inputted character pattern in color (black and white) is selected. Then, the inputted character pattern and the selected stored character pattern are determined as being "Identical".

(4) If the database has no stored character pattern having not less than a predetermined number of pixels that are identical with those of the inputted character pattern in color (black and white), it will be decided that the comparison is impossible.

(5) The reliability determining section 21 carries out the procedure (1) through (4) with respect to all of the inputted character patterns, and counts the number of characters determined as "Identical".

(6) The reliability determining section 21 carries out rotation processing (rotation in a direction shown in FIGS. 2(*a*) and 2(*b*) (i.e. clockwise direction)) at a rotation angle of 90° with respect to all of the inputted character patterns, carries out procedure (1) through (4) with respect to all of the inputted character patterns which have been subjected to the rotation processing, and counts the number of characters determined as "Identical".

(7) The reliability determining section 21 carries out processing similar to (6) at a rotation angle of 180°. Further, the reliability determining section 21 carries out processing similar to (6) at a rotation angle of 270°.

(8) The reliability determining section 21 determines, as a reliability value of the first direction, the number of characters determined as "Identical" in the comparing processing carried out with respect to inputted character patterns which is not subjected to rotation processing (inputted character patterns at a rotation angle of 0°). The reliability determining section 21 determines, as a reliability value of the second direction, the number of characters determined as "Identical" in the comparing processing carried out with respect to inputted character patterns which has been subjected to rotation processing at a rotation angle of 90°. The reliability determining section 21 determines, as a reliability value of the third direction, the number of characters determined as "Identical" in the comparing processing carried out with respect to inputted character patterns which has been subjected to rotation processing at a rotation angle of 180°. The reliability determining section 21 determines, as a reliability value of the fourth direction, the number of characters determined as "Identical" in the comparing processing carried out with respect to inputted character patterns which has been subjected to rotation processing at a rotation angle of 270°.

Figure 3A:
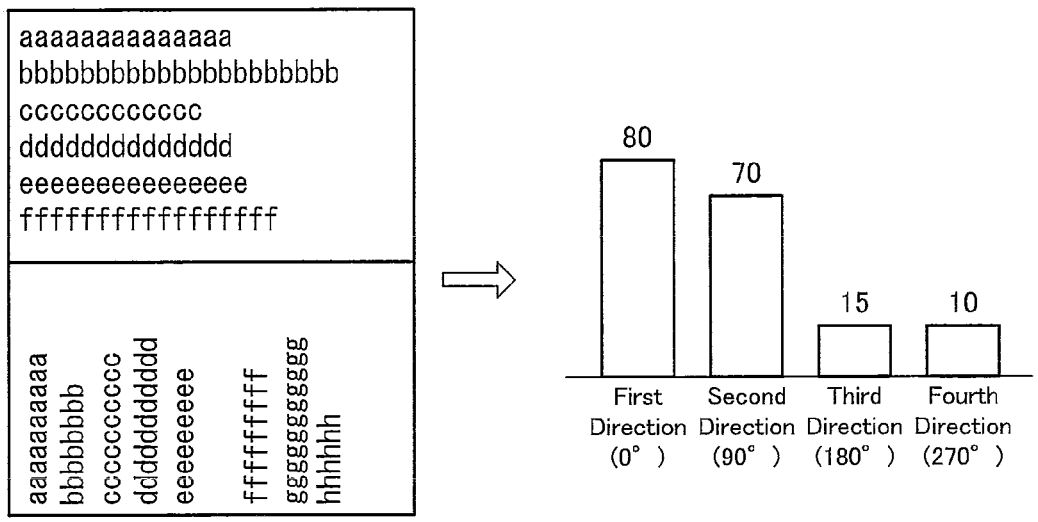
FIG. 3(a)
Figure 3B:
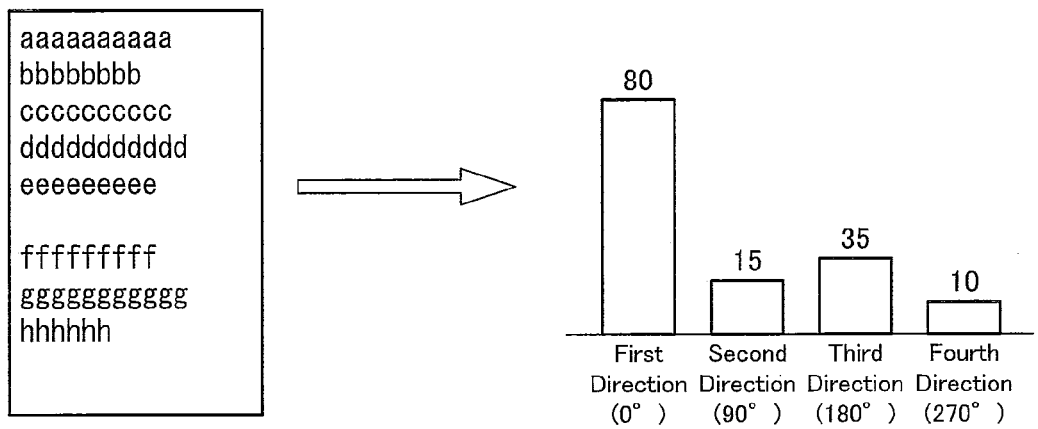
FIG. 3(b)
Figure 3C:
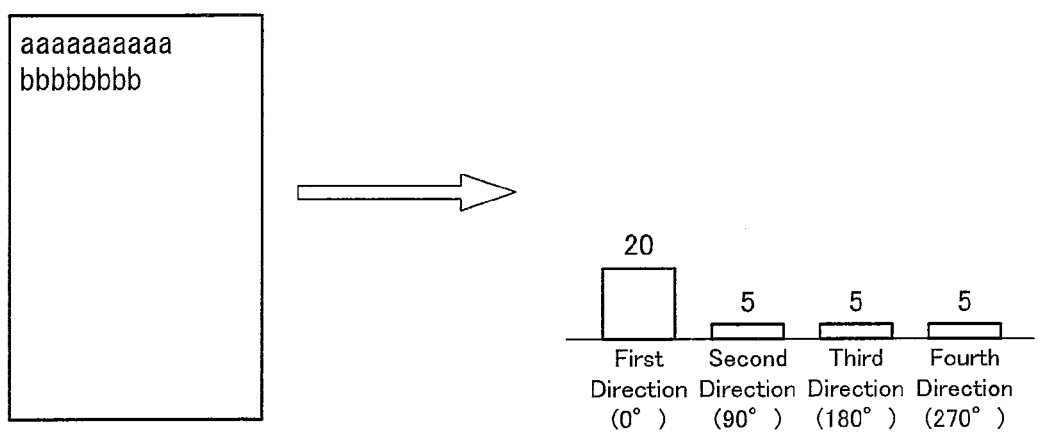
FIG. 3(c)

For example, in a case where all characters face the same direction as in FIG. 3(*b*), only a reliability value of one of the directions becomes large. In a case where (i) a character group which faces one direction and (ii) a character group which faces another direction are mixed in the information image 301 as in FIG. 3(*a*), only reliability values of two of the directions become large, and reliability values of the other directions become small. In a case where the number of characters shown in the information image 301 is small as in FIG. 3(*c*), all of the directions have a small reliability value.

(Display Control Section 22)

The following description deals with the display control section 22 shown in FIG. 1. The display control section 22 shown in FIG. 1 reads out a document image 300 (see FIG. 2(*a*)) stored in the storage section 12, and carries out downsampling, instruction mark forming processing, and selection mark forming processing with respect to the document image 300 so as to create a preview image 400 (see FIG. 2(*b*)). The display control section 22 then causes the display device 11 to display the preview image 400. The downsampling, the instruction mark forming processing, and the selection mark forming processing are described below in detail.

(Downsampling)

The display control section 22 reads out a document image 300 stored in the storage section 12, and then downsamples the document image 300 so as to downsize the document image 300. The document image 300 is downsampled so that an entire information image 301 shown in the document image 300 that has been subjected to the downsampling is displayed on the display device 11. Further, the downsampling is carried out by an interpolation process, such as a nearest neighbor method, a bilinear method, or a bicubic method, for example.

The nearest neighbor method is a method in which either a value of an existing pixel that is closest to the interpolation pixel generated by an interpolation, or a value of an existing pixel that is in a predetermined positional relationship with the interpolation pixel is provided as a value of an interpolation pixel. The bilinear method is a method in which (i) a weighted average value of values of four existing pixels surrounding an interpolation pixel (a weight is a factor proportional to a distance from the interpolation pixel to an existing pixel) is obtained, and (ii) the obtained value is provided as a value of the interpolation pixel. The bicubic method is a method in which interpolation calculations are carried out by use of a total of 16 existing pixels (the four existing pixels surrounding the interpolation pixel, and 12 existing pixels surrounding said four existing pixels).

(Instruction Mark Forming Processing)

The display control section 22 also carries out processing of forming instruction marks (direction recognition markers) 501 through 504 with respect to the document image 300 which has been subjected to downsampling.

As shown in FIG. 2(b), the instruction mark 501 is superimposed on the document image 300 in the preview image 400 so as to be positioned in the first direction side. Thus, the instruction mark 501 serves as a marker indicating the first direction. As shown in FIG. 2(b), the instruction mark 502 is superimposed on the document image 300 in the preview image 400 so as to be positioned in the second direction side. Thus, the instruction mark 502 serves as a marker indicating the second direction. As shown in FIG. 2(b), the instruction mark 503 is superimposed on the document image 300 in the preview image 400 so as to be positioned in the third direction side. Thus, the instruction mark 503 serves as a marker indicating the third direction. As shown in FIG. 2(b), the instruction mark 504 is superimposed on the document image 300 in the preview image 400 so as to be positioned in the fourth direction side. Thus, the instruction mark 504 serves as a marker indicating the fourth direction.

The instruction mark forming processing is such that (i) positions (coordinates) where the instruction marks 501 through 504 is superimposed on the document image 300 which has been subjected to downsampling are obtained, and (ii) the document image 300 is image-processed so that the instruction marks 501 through 504 are superimposed on the information image 301 in the obtained positions, respectively. The following description deals with a method of obtaining positions where the instruction marks 501 through 504 are superimposed on the information image 301. Note that the following description deals with, as an example, a method of obtaining a position where the instruction mark 502 is superimposed on the information image 301.

Figure 4:
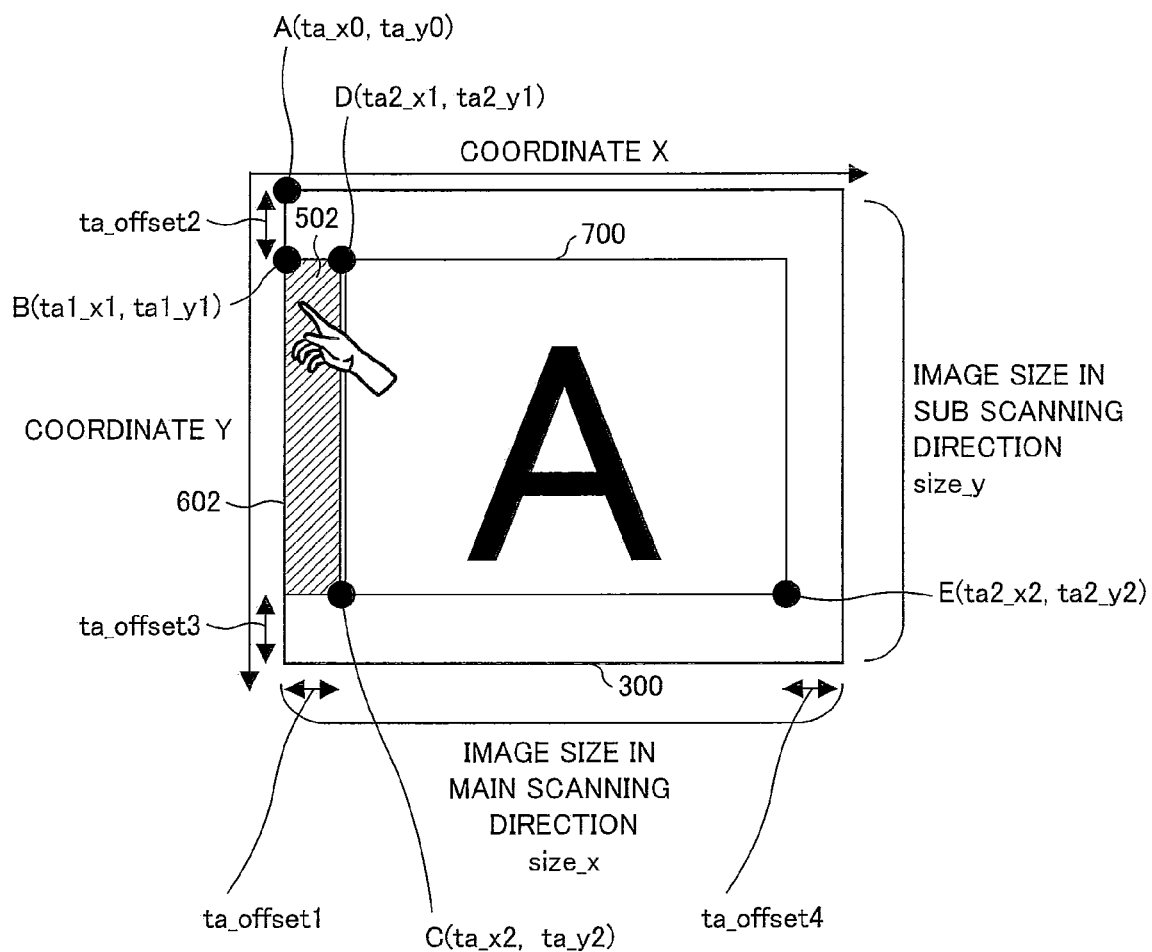
FIG. 4

As shown in FIG. 4, the display control section 22 finds a side 602 of the document image 300 which is in the second direction side, and provides an end of the side 602 as a coordinate A (ta_x0, ta_y0). The coordinate A (ta_x0, ta_y0) satisfies the following formulas 1 and 2. Further, the display control section 22 finds a coordinate B (ta1_x1, ta1_y1) which satisfies the following formulas 3 and 4, and a coordinate C (ta1_x2, ta1_y2) which satisfies the following formulas 5 and 6.

$$ta\_x0=0 \quad \text{Formula 1.}$$

$$ta\_y0=0 \quad \text{Formula 2.}$$

$$ta1\_x1=0 \quad \text{Formula 3.}$$

$$ta1\_y1=ta\_offset2 \quad \text{Formula 4.}$$

$$ta1\_x2=ta\_offset1-1 \quad \text{Formula 5.}$$

$$ta1\_y2=(size\_y)-(ta\_offset3)-1 \quad \text{Formula 6.}$$

The display control section 22 provides the coordinate B (ta1_x1, ta1_y1) and the coordinate C (ta1_x2, ta1_y2) as vertexes in the document image 300, and sets such a rectangle region that a straight line between the vertexes is a diagonal line of the rectangle region. Then, the display control section 22 determines all pixels included in the rectangle region as a region of the instruction mark 502. Further, the display control section 22 determines regions of the instruction marks 501, 503 and 504 by a method similar to the method of determining the region of the instruction mark 502.

Further, the display control section 22 causes the instruction marks 501 through 504 to be displayed in respective different ways by changing respective densities in accordance with reliability values of the respective directions (see FIGS. 2(a) and 2(b)). More specifically, the display control section 22 causes the instruction marks 501 through 504 to be displayed in the respective different ways by changing respective densities in accordance with the order of the reliability values of the respective directions. This is described below in detail.

In the present embodiment, the display control section 22 sets the densities of the respective instruction marks 501 through 504 so that an instruction mark indicating a direction which is ranked higher in the order of the reliability value is higher in density. Specifically, in the example of FIGS. 2(a) and 2(b), the instruction mark 503 which indicates the third direction having a reliability value of 80 is the highest in density, the instruction mark 501 which indicates the first direction having a reliability value of 35 is the second highest in density, the instruction mark 504 which indicates the fourth direction having a reliability value of 15 is the third highest in density, and the instruction mark 502 which indicates the second direction having a reliability value of 10 is the lowest in density.

The following description deals with how to set the densities of the respective instruction marks 501 through 504 in accordance with the order of the reliability values of the respective directions. For example, as shown in FIGS. 5(a) and 5(b), a combination of tables in which the order of reliability value is associated with density values is stored in the storage section 12. The display control section 22 determines the order of reliability value with respect to the first through fourth directions on the basis of reliability values of the respective first through fourth directions which are determined by the reliability determining section 22. The display control section 22 then reads out, from the tables shown in FIGS. 5(a) and 5(b), density values of the respective first through fourth directions in accordance with the order of reliability value. For example, according to the tables of FIGS. 5(a) and 5(b), an instruction mark which indicates a direction whose reliability value is ranked first in the order of the reliability value has a density value of (R, G, B)=(20, 0, 127), and an instruction mark which indicates a direction whose reliability value is ranked second in the order of the reliability value has a density value of (R, G, B)=(75, 0, 127). Note that, in FIGS. 5(a) through 5(c), the higher the density becomes, the lower the density value becomes.

A combination of tables in which the order of the reliability value is associated with density values is not limited to the combination of the table of FIG. 5(a) and the table of FIG. 5(b). For example, a combination of the table of FIG. 5(a) and a table of FIG. 5(c) is possible. According to this combination, it is possible to cause density values of respective instruction marks to be changed in accordance with a ratio of a reliability value to the highest reliability value. Further, according to the combination of the table of FIG. 5(a) and the table of FIG. 5(c), it is possible to cause a density value of an instruction mark which indicates a direction whose reliability value is not ranked first in the order of the reliability value to be changed in accordance with the reliability value of the direction.

(Selection Mark Forming Processing)

Further, the display control section 22 carries out processing of forming a selection mark (image selection marker) 700 with respect to the document image 300. The display control section 22 determines, as a preview image 400, the document image 300 on which the selection mark 700 is formed.

As shown in FIG. 2(b), the selection mark 700 is formed in a region of the document image 300 shown in the preview image 400 in which region the instruction marks 501 through 504 are not formed. For example, the selection mark 700 is formed in a central region of the document image 300. A function of the selection mark 700 is described later.

The selection mark forming processing is such that (i) a position (coordinate) where the selection mark 700 is superimposed on the document image 300 which has been subjected to downsampling is obtained, and (ii) the document image 300 which has been downsampled (thumbnail image of the document image) is image-processed so that the selection mark 700 is superimposed on the document image 300 in the obtained position. The following description deals with a method for obtaining a position where the selection mark 700 is superimposed on the document image 300.

As shown in FIG. 4, the display control section 22 finds a coordinate D (ta2_x1, ta2_y1) which satisfies the following formulas 7 and 8, and a coordinate E (ta2_x2, ta2_y2) which satisfies the following formulas 9 and 10.

$$ta2\_x1 = ta\_offset1 + 1 \quad \text{Formula 7.}$$

$$ta2\_y1 = ta\_offset2 + 1 \quad \text{Formula 8.}$$

$$ta2\_x2 = (size\_x) - (ta\_offset4) - 1 \quad \text{Formula 9.}$$

$$ta2\_y2 = (size\_y) - (ta\_offset3) - 1 \quad \text{Formula 10.}$$

The display control section 22 provides the coordinate D (ta2_x1, ta2_y1) and the coordinate E (ta2_x2, ta2_y2) as vertexes in the document image 300, and sets such a rectangle region that a straight line between the vertexes is a diagonal line of the rectangle region. Then, the display control section 22 determines all pixels included in the rectangle region as a region of the selection mark 700.

After the downsampling, the instruction mark forming processing, and the selection mark forming processing, the display control section 22 carries out tone correction processing (gamma correction) with respect to the preview image 400 (see FIG. 2(b)) created through the downsampling, the instruction mark forming processing, and the selection mark forming processing, and then causes the display device 11 to display the preview image 400 that has been subjected to the tone correction processing. Note that the tone correction processing is tone conversion processing carries out in accordance with display characteristics of the display device 11.

(Rotation Processing Section 23)

The following description deals with the rotation processing section 23 shown in FIG. 1. The rotation processing section 23 shown in FIG. 1 is a block which, in a case where a user selects one of the instruction marks 501 through 504 shown in the preview image 400 displayed on the display device 11, (i) reads out the document image 300 stored in the storage section 12, and (ii) carries out rotation processing with respect to the read-out document image 300 in a rotation direction shown in FIG. 2(a) (i.e. in a clockwise direction).

More specifically, the rotation processing section 23 carries out the rotation processing with respect to the document image 300 so that a direction indicated by the indication mark selected by the user coincides with the second reference direction (upward direction of the document image) of the document image 300 which has been subjected to the rotation processing. The rotation processing is carried out to the document image 300 which has not been subjected to downsampling.

That is, in a case where the user selects the instruction mark 503 of FIG. 2(b), the document image 300 shown in FIG. 2(a) is subjected to rotation processing at a rotation angle of 180° in a clockwise direction. In a case where the user selects the instruction mark 504 of FIG. 2(b), the document image 300 shown in FIG. 2(a) is subjected to rotation processing at a rotation angle of 270° in a clockwise direction (rotated at 270° in a clockwise direction). In a case where the user selects the instruction mark 502 of FIG. 2(b), the document image 300 shown in FIG. 2(a) is subjected to rotation processing at a rotation angle of 90° in a clockwise direction (rotated at 90° in a clockwise direction). Further, in a case where the user selects the instruction mark 501 of FIG. 2(b), the document image 300 shown in FIG. 2(a) is subjected to rotation processing at a rotation angle of 0° in a clockwise direction (that is, the document image 300 is not rotated).

The document image 300 stored in the storage section 12 may be overwritten with the document image 300 that has been subjected to the rotation processing. Alternatively, the document image 300 that has been subjected to the rotation processing may be outputted from the image processing apparatus 10 so as to be subjected to print processing. Alternatively, the document image 300 that has been subjected to the rotation processing may be transmitted to an external device.

Note that a user may select one of the instruction marks 501 through 504 or the selection mark 700 using a cursor displayed in the display device 11. In a case where the display device 11 has a touch panel which allows the user to input a command by touching a screen, the user may select one of the instruction marks 501 through 504 or the selection mark 700 by touching the one of the instruction marks 501 through 504 or the selection mark 700. That is, each of the instruction marks 501 through 504 of the present embodiment functions as a graphical user interface, and also functions as a button for a user to input a command to carry out rotation processing or set a rotation angle. Further, the selection mark 700 functions as a graphical user interface, and also functions as a button for a user to select a document image to be subjected to rotation processing.

(Case where Image Data Contains a Plurality of Document Images)

The following description deals with processing of the image processing apparatus 10 which is carried out in a case where image data contains a plurality of document images. In a case where image data contains a plurality of document images, the reliability determining section 21 determines reliability values of respective directions for each of the plurality of document images.

FIG. 9 is a view showing reliability values of respective directions of each of the six document images (document images of page 1 through page 6). As for the document image of page 1, a reliability value of the first direction is 80, a reliability value of the second direction is 10, a reliability value of the third direction is 35, and a reliability value of the fourth direction is 15. As for the document image of page 2, a reliability value of the first direction is 10, a reliability value of the second direction is 5, a reliability value of the third direction is 25, and a reliability value of the fourth direction is 7. As for the document image of page 3, a reliability value of the first direction is 20, a reliability value of the second direction is 15, a reliability value of the third direction is 75, and a reliability value of the fourth direction is 10. As for the document image of page 4, a reliability value of the first direction is 15, a reliability value of the second direction is 80, a reliability value of the third direction is 25, and a reliability value of the fourth direction is 35. As for the document image of page 5, a reliability value of the first direction is 15, a reliability value of the second direction is 45, a reliability value of the third direction is 10, and a reliability value of the fourth direction is 20. As for the document image of page 6, a reliability value of the first direction is 15, a reliability value of the second direction is 35, a reliability value of the third direction is 25, and a reliability value of the fourth direction is 30.

The first direction has the highest reliability in the document image of page 1, the third direction has the highest reliability in the document image of page 2, the third direction has the highest reliability in the document image of page 3, the second direction has the highest reliability in the document image of page 4, the second direction has the highest reliability in the document image of page 5, and the second direction has the highest reliability in the document image of page 6.

Next, the display control section 22 divides the plurality of document images into groups so that a document image(s), having the same direction whose reliability value is the highest, belong to the same group. The display control section 22 then causes the display device 11 to display, as preview images, a plurality of document images of each of the groups.

Figure 10:
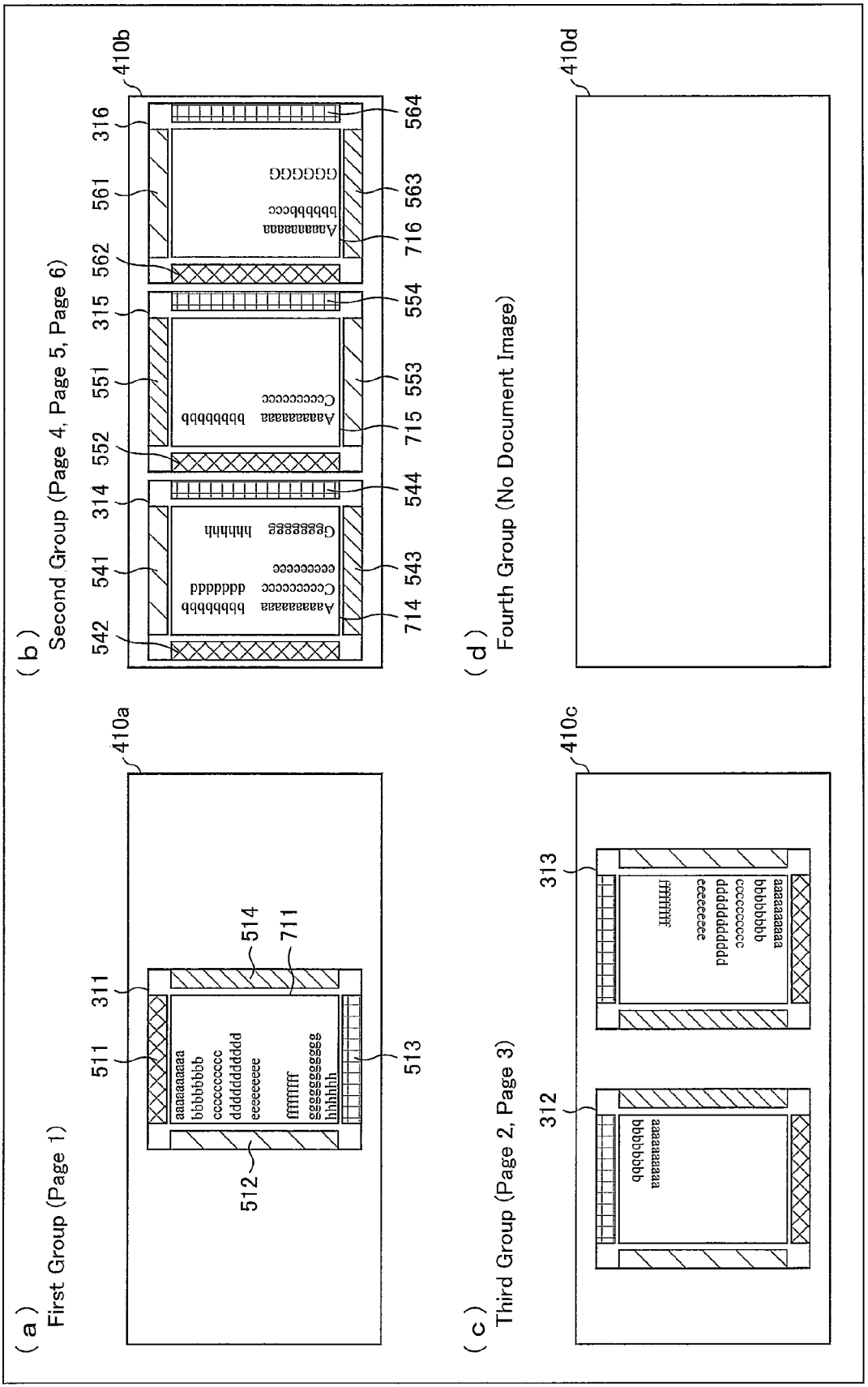
FIG. 10

FIG. 10 is a view showing preview images 410a through 410d of respective groups each containing a document image(s), the preview images 410a through 410d being displayed for the respective groups on the display device 11. (a) of FIG. 10 is a view showing the preview image 410a of a first group including a document image (thumbnail image of the document image) 311 of page 1 whose first direction is a direction of the highest reliability value. (b) of FIG. 10 is a view showing a preview image 410b of a second group including a document image 314 of page 4, a document image 315 of page 5, and a document image 316 of page 6, whose second directions are directions of the respective highest reliability values. (c) of FIG. 10 is a view showing a preview image 410c of a third group including a document image 312 of page 2 and a document image 313 of page 3, whose third directions are directions of the respective highest reliability values. (d) of FIG. 10 is a view showing a preview image 410d of a fourth group including a document image whose fourth direction is a direction of the highest reliability value. Here, since there is no document image whose fourth direction is a direction of the highest reliability, the preview image 410d contains no document image.

First, the display control section 22 causes the display device 11 to display the preview image 410a corresponding to the first group whose first direction is a direction of the highest reliability value (see (a) of FIG. 10). The display control section 22 then accepts a command causing processing to carry out with respect to the document image 311 shown in the preview image 410a. A user selects one of instruction marks 511 through 514 or a selection mark 711 of document image 311, for example by operating a cursor or by touching the touch panel, as described above.

If the user selects one of the instruction marks 511 through 514, the rotation processing section 23 carries out processing (e.g. rotation processing), in accordance with the selected instruction mark, with respect to the document image 311. The rotation processing section 23 can overwrite and store the document image 311, which has been subjected to the rotation processing, in the storage section 12. Alternatively, the document image 311 that has been subjected to the rotation processing may be outputted from the image processing apparatus 10 so as to be subjected to print processing. Alternatively, the document image 311 that has been subjected to the rotation processing may be transmitted to an external device. Further, a preview image of the document image 311 that has been subjected to the rotation processing may be displayed again, as the preview image 410a, on the display device 11 so that the user can check the result of the processing. In the present embodiment, if the document image 311 shown in the preview image 410a is subjected to rotation processing, the display control section 22 causes the display device 11 to display again, as the preview image 410a, a preview image of the document image 311 that has been subjected to the rotation processing.

If a user inputs a command instructing not to carry out correction into the image processing apparatus via an operation panel (not shown) for example, the display control section 22 causes the display device 11 to display the preview image 410b corresponding to the second group in which the second direction has the highest reliability in replacement of the preview image 410a (see (b) of FIG. 10).

The preview image 410b contains three document images, i.e., the document image 314, the document image 315, and the document image 316. The document images 314 through 316 belong to a group in which the second direction of the first through fourth directions most highly likely coincides with the first reference direction. Therefore, the first reference directions of the respective document images 314 through 316 contained in the preview image 410b highly likely coincide with one another.

If a user selects one of instruction marks 541 through 544, one of instruction marks 551 through 554, or one of instruction marks 561 through 564, rotation processing is carried out to a document image corresponding to the instruction mark selected by the user of the document images of the second group contained in the preview image 410b.

Since the first reference directions of the respective document images shown in the preview image 410b highly likely coincides with one another, there is a case where the user must carry out the same rotation processing with respect to the document images.

In a case where the user wants to carry out the same rotation processing with respect to the document images, the user selects selection marks 714 through 716 of the document images to which the user wants to carry out the rotation processing. The display control section 22 causes the display device 11 to display the preview image 410b so that the user can recognize a document image whose selection mark has been selected, for example, by changing color or shape of the selected selection mark.

Next, the user selects one of the instruction marks of any one of the document images whose selection marks are selected. If the user selects one of the instruction marks of any one of the document images whose selection marks are selected, the rotation processing section 23 carries out rotation processing corresponding to the selected instruction mark with respect to all of the document images whose selection marks are selected. With this arrangement, a user can carry out (instruct) the same rotation processing collectively with respect to a plurality of document images.

The display control section 22 then causes the display device 11 to display, again as the preview image 410*b*, a preview image containing the document images that have been subjected to the rotation processing. If the user selects (i) one of instruction marks of any one of the document images or (ii) selection marks of the respective document images and one of instruction marks of any one of the document images, the document image(s) is(are) subjected to further rotation processing.

Alternatively, the display control section 22 may cause the display device 11 to display the preview image 410*b* so that the preview image 410*b* does not contain document images that have been subjected to rotation processing, but contains only a document image that has not been subjected to the rotation processing. With the arrangement, the document images that have been subjected to the rotation processing are eliminated from the preview image 410*b*. This allows the user to more easily confirm the document image that has not been subjected to the rotation processing.

If the user inputs a command instructing not to carry out correction into the image processing apparatus 10 via an operation panel (not shown) for example, the display control section 22 causes the display device 11 to display the preview image 410*c* corresponding to the third group in which the third direction has the highest reliability in replacement of the preview image 410*b* (see (c) of FIG. 10). Alternatively, the display control section 22 may cause the display device 11 to display the preview image 410*c* of the third group when all the document images belonging to the second group have been subjected to rotation processing.

The document images belonging to the third group are subjected to operations and processing similar to the case of the second group in accordance with instructions from the user. Since there is no document image in the fourth group in the present embodiment, the preview image 410*d* of the fourth group is not displayed, and correction of orientation (rotation processing) of the document images contained in the image data is finished when processing to the third group is finished (when a command instructing not to carry out correction is inputted).

The rotation processing section 23 may overwrite the document images stored in the storage section 12 with the document images that have been subjected to the correction. Alternatively, the document images that have been subjected to the correction may be outputted from the image processing apparatus 10 so as to be subjected to print processing, or may be transmitted to an external device.

(Processing Flow)

The following description deals with a procedure of processing of the image processing apparatus 10 which is carried out in a case where image data contains a plurality of document images with reference to FIG. 6. FIG. 6 is a flow chart showing a flow of processing carried out in the present embodiment.

First, if a plurality of document images are read from respective documents by the image input apparatus (scanner), image data containing the plurality of document images are stored in the storage section 12 (S1). Next, the reliability determining section 21 refers to the plurality of document images in the image data stored in the storage section 12 so as to determine reliability values of the respective first through fourth directions in each of the plurality of document images (S2), the reliability values indicating reliability of coincidences of the respective first through fourth directions with the first reference direction (upward direction of an information image shown in each of the plurality of document images).

Subsequently, the display control section 22 divides the plurality of document images into groups so that a document image(s), having the same direction whose reliability value is the highest, belong to the same group (S3).

Further, the display control section 22 reads out the image data containing the plurality of document images from the storage section 12 (S4), and then carries out downsampling with respect to each of the plurality of document images (S5).

After S5, the display control section 22 forms instruction marks indicating the respective first through fourth directions and selection marks based on (i) the plurality of document images that have been subjected to the downsampling (thumbnail images of the respective document images) and (ii) the reliability values of the respective first through fourth directions (S6).

The display control section 22 then causes the display device 11 to display, as preview images, document images of each of the groups (S7). In each of the preview images, instruction marks and a selection mark are superimposed on a document image that has been subjected to the downsampling.

Here, the image processing apparatus 10 accepts an instruction from a user to select an instruction mark or a command instructing not to carry out correction (S8). In this step, the image processing apparatus 10 also accepts an instruction to select a selection mark. Note that, in the present embodiment, the image processing apparatus 10 accepts an instruction to select a selection mark until an instruction to select an instruction mark or a command instructing not to carry out correction is inputted so that the user can select a plurality of selection marks.

After S8, in a case where (i) a user selects any one of instruction marks of any one of the document images ("Yes" in S9), and (ii) does not select any of the selection marks ("No" in S10), the rotation processing section 23 reads out the document image whose instruction mark was selected from the storage section 12, and then carries out rotation processing with respect to the read-out document image (S11). Further, after S8, in a case where (i) a user selects any one of instruction marks of any one of the document images ("Yes" in S9), and (ii) selects any of the selection marks ("Yes" in S10), the rotation processing section 23 reads out all the document images whose selection marks were selected from the storage section 12, and then carries out the same rotation processing with respect to all of the read-out document images (S12). Note that the rotation processing section 23 carries out rotation processing with respect to a document image(s) so that a direction corresponding to a selected instruction mark coincides with the second reference direction (upward direction of the document image) after the rotation processing.

After S11 or S12, in a similar manner to the processing in S5 though S7, the display control section 22 causes the display device 11 to display a preview image containing the document image(s) that has(have) been subjected to the rotation processing (thumbnail image(s) of the document image(s)) (S13).

After S8, (i) in a case where the user does not select any of the instruction marks, i.e., in a case where the user input a command not to carry out correction in S8 ("No" in S9), and (ii) in a case where there is a group whose preview image has never been displayed ("No" in S14), the display control section 22 causes the display device 11 to display a preview image of such a group. Further, in a case where preview images of all of the groups have been displayed and correction (processing) of the document images is finished ("No" in S9, "Yes" in S14), the rotation processing section 23 finishes processing without carrying out rotation processing.

According to the arrangement, the instruction marks 501 through 504 indicating the respective first through fourth directions are displayed in respective different ways by changing respective densities in accordance with reliability of coincidences of the respective first through fourth directions with the first reference direction (see FIGS. 2(*a*) and 2(*b*)). This allows a user to easily recognize orientation of an information image, thereby making it possible for the user to easily determine whether correction of document orientation (rotation processing in the present embodiment) is necessary or not and to easily determine a rotation angle in the rotation processing.

In a case where a plurality of document images are processed, the plurality of document images are divided into groups so that a document image(s), having the same direction whose reliability is the highest, belong to the same group, and preview images of the respective groups are displayed one by one. Therefore, in each of the preview images, document images highly likely coincide with each other in terms of the first reference direction. In a case where the first reference direction is the same for many of the document images shown in the preview image, a document image whose first reference direction is different from that of the other document images is noticeable, and a user therefore can easily find such a document image even if the size of the preview image is small. Further, the user can easily carry out processing (e.g. rotation processing) with respect to a plurality of document images since many of the document images are subjected to the same processing (e.g. rotation processing).

Further, a user can carry out processing (e.g. rotation processing) collectively with respect to a plurality of document images by selecting selection marks. Also in this case, the user can easily find document images that should be selected since many of the document images coincide with each other in terms of the first reference direction.

In the present embodiment, reliability values of respective four directions, i.e., first through fourth directions are determined, and rotation processing is carried out with respect to a document image based on the reliability values. However, the number of directions whose reliability values are determined is not limited to four. For example, another arrangement is possible in which, on the assumption that the first reference direction is tilted with respect to the second reference direction by 45°, reliability values of respective eight directions are determined, and rotation processing is carried out based on the reliability values. Generally, the number of directions whose reliability is obtained is not limited to a specific one.

The above description has dealt with a case in which a reliability value becomes larger as reliability becomes higher. However, a reliability value may become smaller as reliability becomes higher.

Further, a thumbnail image which is obtained from a document image so as to be shown in a preview image is not limited to the one obtained by downsampling the document image, but can be a part of the document image or can be the one obtained by scaling down a part of the document image.

There is a case where the number of document images belonging to one group is too large, and the size of each of the document images becomes too small. In this case, a user has difficulty in recognizing each of the document images. In view of this, it is possible that all the document images belonging to the group are not contained in a single preview image. Instead, the document images belonging to the group may be further divided into groups so that (i) a plurality of preview images are created and (ii) the plurality of preview images are displayed and processed one by one. This allows a user to easily check orientation of the document images by looking at each of the plurality of preview images. Further, a document image in which more than one direction has the highest reliability may belong to any group.

Further, shape and position of a selection mark and an instruction mark are not limited to specific ones, provided that a user can recognize which document image corresponds to which selection mark, and which document image and direction correspond to which instruction mark. For example, an instruction mark may be disposed on an opposite side of a direction which the instruction mark indicates. Specifically, it is possible that, in FIG. 2(*b*), the instruction mark 501 indicating the first direction is exchanged with the instruction mark 503 indicating the third direction, and the instruction mark 502 indicating the second direction is exchanged with the instruction mark 504 indicating the fourth direction. Further, it is possible that no selection mark is formed. In this case, a user can collectively check first reference directions of respective document images, but is required to make selection of an instruction mark with respect to all of the document images to which the user wants to carry out processing (e.g. rotation processing). However, even in a case where no selection mark is formed, the user can easily recognize which instruction mark should be selected since many of the document images coincide with each other in terms of the first reference direction. Further, it is possible that no instruction mark is formed. Even in this case, a user can check a plurality of document images which are displayed for each group. The user can input an instruction by using an instruction input apparatus such as an operation panel instead of using an instruction mark or a selection mark. The user can use the instruction input apparatus to select document images and input a command to carry out rotation processing with respect to the selected document images. With this arrangement, the user can select desired document images by looking at the display device, and can carry out processing with respect to the desired document images.

The present embodiment has discussed an image processing apparatus which carries out rotation processing with respect to selected document images. However, processing carried out to document images is not limited to rotation processing. The image processing apparatus may be arranged so as to instruct an image forming apparatus or the like to carry out processing such as printing with respect to selected document images. Alternatively, the image processing apparatus may be arranged so as to instruct the image forming apparatus or the like not to print selected document images.

The present embodiment has discussed an image processing apparatus which carries out processing with respect to image data containing document images read from respective documents by an image reading apparatus (scanner). However, images contained in the image data are not limited to document images read from respective documents, but can be images which are formed in a personal computer and which have different first reference directions (upward directions of the images).

The display control section 22 causes the instruction marks 501 through 504 to be displayed in respective different ways by changing respective densities in accordance with the order of the reliability. However, the present invention is not limited to the arrangement in which the instruction marks 501 through 504 are displayed in respective different ways by changing respective densities. Alternatively, the display control section 22 may cause the instruction marks 501 through

504 to be displayed in respective different ways by changing respective colors in accordance with the order of reliability. For example, such an arrangement is possible that color of an instruction mark indicating a direction which has the largest reliability value is red, color of an instruction mark indicating a direction which has the second largest reliability value is green, color of an instruction mark indicating a direction which has the third largest reliability value is blue, and color of an instruction mark indicating a direction which has the lowest reliability value is yellow.

Figure 7:
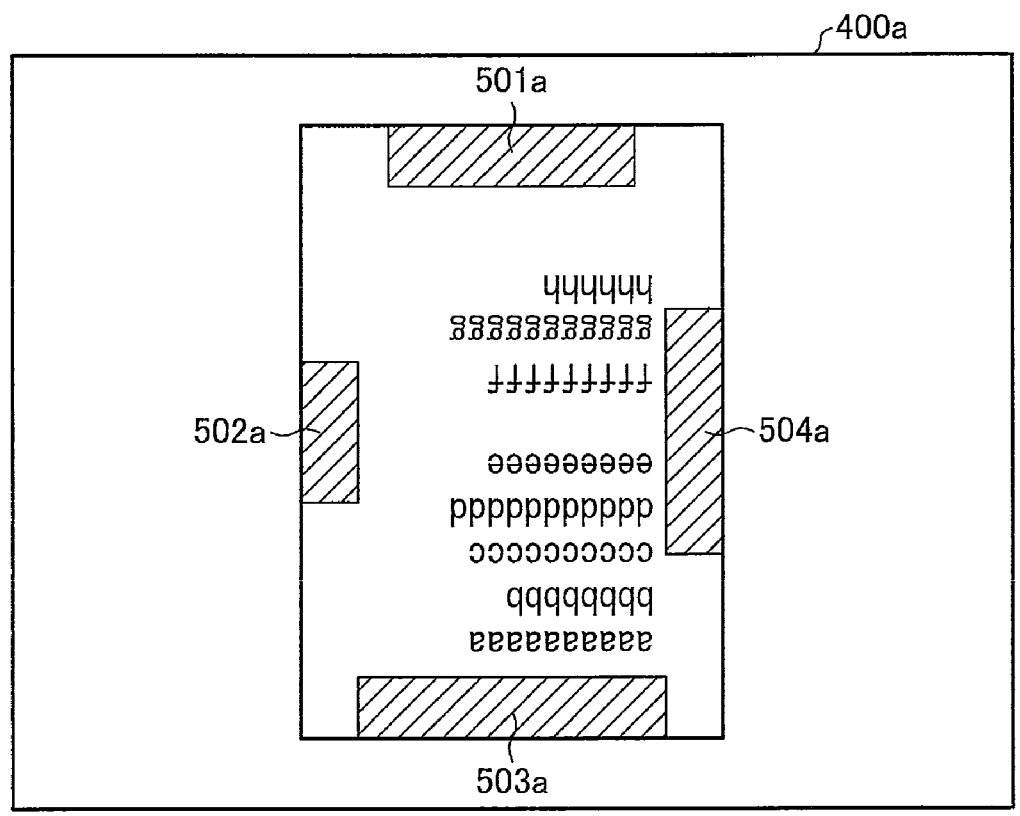
FIG. 7

Further, the display control section 22 may cause the instruction marks 501 through 504 to be displayed in respective different ways by changing respective sizes in accordance with the order of the reliability. For example, it is possible that an instruction mark which indicates a direction having higher reliability is larger in size. In this case, instruction marks 501a through 504a of a preview image 400a created based on the document image 300 shown in FIG. 2(a) are as shown in FIG. 7. Note that the instruction mark 501a indicates the first direction, the instruction mark 502a indicates the second direction, the instruction mark 503a indicates the third direction, and the instruction mark 504a indicates the fourth direction.

Further, such an arrangement is possible that the instruction marks 501 through 504 are displayed in respective different ways by changing respective densities or sizes, and an instruction mark indicating a direction having the highest reliability is caused to blink.

The following description deals with an example of how to set sizes of respective instruction marks. For example, a combination of tables in which the order of the reliability value is associated with the size of instruction marks is stored in the storage section 12 (see FIGS. 8(a) and 8(b)), and the size (pixel number) is set in accordance with the order of the reliability value with reference to the tables. The formulas 1 through 6 are appropriately corrected so that each of the instruction marks has the size that has been set. According to the combination of the table of FIG. 8(a) and the table of FIG. 8(b), an instruction mark which indicates a direction having higher reliability is larger in size. Instead of the magnification ratio shown in FIG. 8(b), any magnification ratio can be set in accordance with the order of the reliability.

Further, a combination of the table of FIG. 8(a) and a table of FIG. 8(c) can be used to set the size (pixel number) in accordance with the order of the reliability value. According to the combination of the table of FIG. 8(a) and the table of FIG. 8(c), it is possible to cause the size of an instruction mark to be changed in accordance with a ratio of a reliability value of a direction indicated by the instruction mark to the largest reliability value. Further, it is possible to cause the sizes of respective instruction marks indicating respective directions which do not have the largest reliability value to be changed in accordance with the order of the reliability value.

[Embodiment 2]

According to the present embodiment, in a case where the largest reliability value (reliability value of a direction that is ranked first in the order of the reliability value) of reliability values of the respective first through fourth directions of a document image is larger than a threshold value, the document image is not shown in a preview image, and rotation processing is automatically carried out, whereas in a case where the largest reliability value is not more than the threshold value, the document image is displayed in the preview image. This embodiment is described below in detail.

Figure 11:
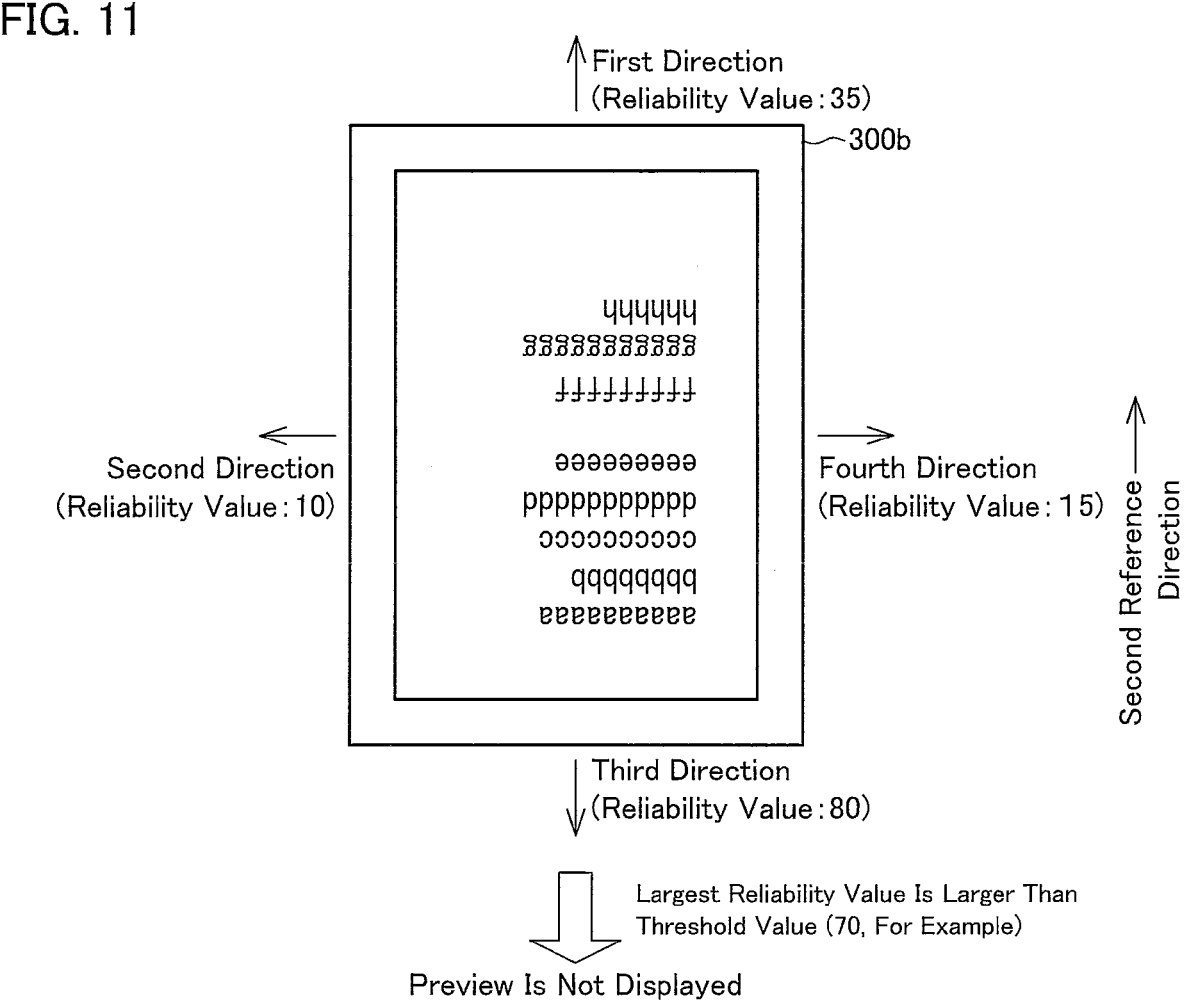
FIG. 11

In a case where the largest reliability value (reliability value of a direction that is ranked first in the order of the reliability value) of reliability values of the respective first through fourth directions of a document image 300b is larger than a predetermined threshold value (see FIG. 11), a direction corresponding to the largest reliability value almost surely coincides with the first reference direction. Therefore, in this case, as shown in FIG. 11, the document image 300b is not shown in a preview image, and rotation processing is automatically carried out so that the direction having the largest reliability value coincides with the second reference direction after the rotation processing. This saves labor and time for a user. Note that the fact that the largest reliability value is larger than the threshold value means that the number of samples used in determining reliability values is large (the number of characters in an information image is large) (see FIG. 11). That is, the reliability values are highly reliable data.

In contrast, in a case where the largest reliability value of reliability values of the respective first through fourth directions of a document image 300c is not more than a predetermined threshold value (see FIG. 12), a direction corresponding to the largest reliability value highly likely coincides with the first reference direction, but there is a little possibility that the direction corresponding to the largest reliability value does not coincide with the first reference direction. Therefore, in this case, if rotation processing is automatically carried out so that the direction corresponding to the largest reliability value coincides with the second reference direction after the rotation processing, there is a possibility that incorrect rotation processing is carried out. In this case, as shown in FIG. 12, in order to prevent incorrect rotation processing from being automatically carried out, a preview image 400c corresponding to the document image 300c should be displayed so that a user is urged to determine whether the rotation processing is necessary or not and to input a rotation angle (select an instruction mark).

In a case where image data contains a plurality of document images (document images of page 1 through page 6) as shown in FIG. 9, and in a case where a threshold value is set to 70 for example, each of (i) the largest reliability value of the document image of page 1 (reliability value of the first direction is 80), (ii) the largest reliability value of the document image of page 3 (reliability value of the third direction is 75), and (iii) the largest reliability value of the document image of page 4 (reliability value of the second direction is 80) is larger than the threshold value. Therefore, each of the document images of pages 1, 3 and 4 is automatically subjected to rotation processing according to a direction corresponding to the largest reliability value. Further, each of the document images of pages 1, 3 and 4 is not contained in a preview image.

Figure 13:
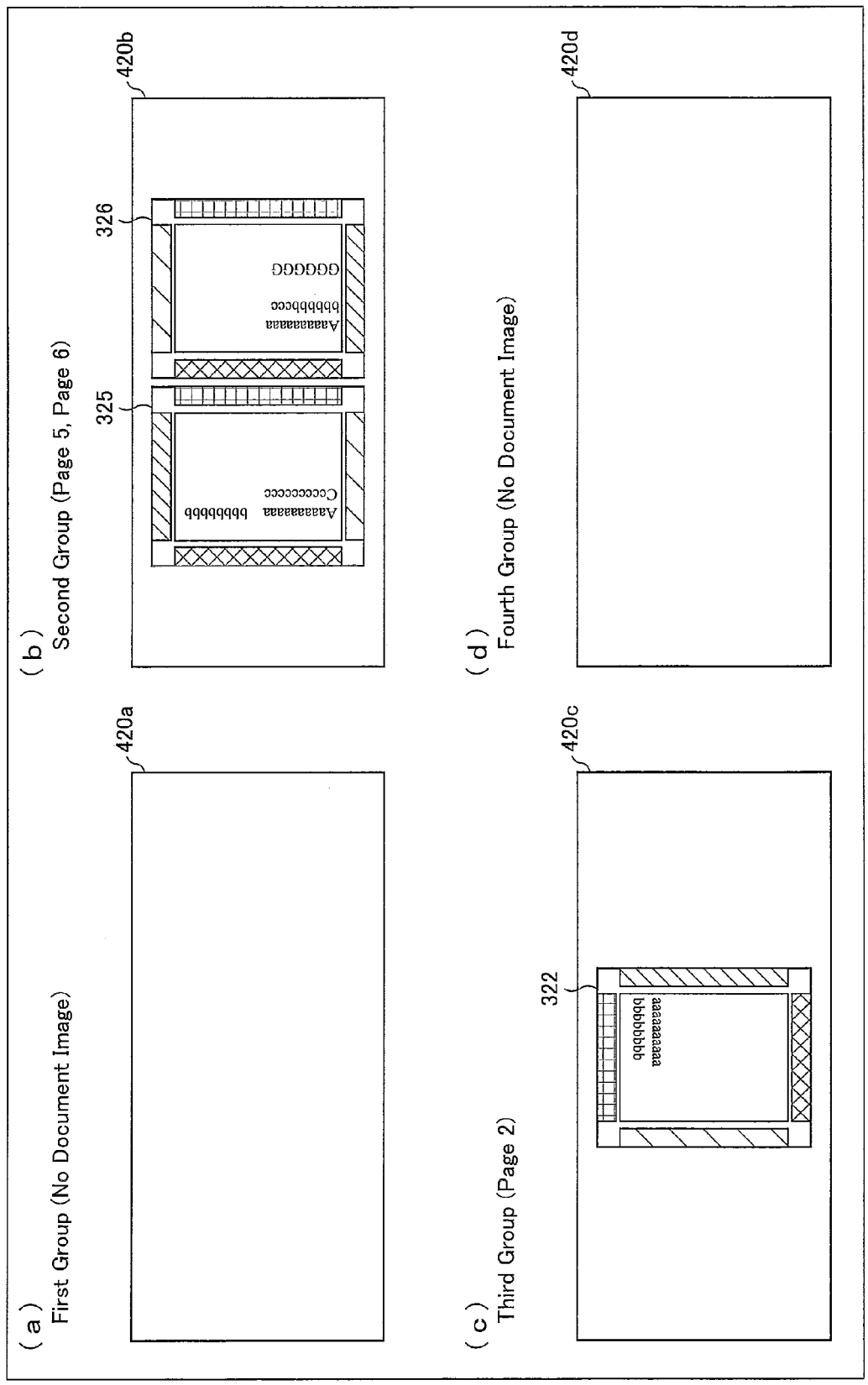
FIG. 13

FIG. 13 is a view showing (i) a preview image of a group in which the first direction has the largest reliability value, (ii) a preview image of a group in which the second direction has the largest reliability value, (iii) a preview image of a group in which the third direction has the largest reliability value, and (iv) a preview image of a group in which the fourth direction has the largest reliability value, in the present embodiment. The document image of page 1 is the only document image in which the first direction has the largest reliability value. However, the largest reliability value of the document image of page 1 is larger than the threshold value. Therefore, the document image of page 1 is automatically subjected to rotation processing and is not included in any groups. Consequently, there is no document image which belongs to a first group in which the first direction has the largest reliability value. Therefore, a preview image 420a is not actually created, and processing of a second group starts.

Each of the document images of pages 4 through 6 is a document image in which the second direction has the largest reliability value. However, the largest reliability value of the document image of page 4 is larger than the threshold value. Therefore, the document image of page 4 is automatically subjected to rotation processing and is not included in any groups. Consequently, only the document images 325 and 326 (pages 5 and 6) belong to a second group in which the second direction has the largest reliability value. A preview image 420b containing the document images of pages 5 and 6 is created, and is displayed.

Each of the document images of pages 2 and 3 is a document image whose third direction is a direction of the largest reliability value. However, the largest reliability value of the document image of page 3 is larger than the threshold value. Therefore, the document image of page 3 is automatically subjected to rotation processing and is not included in any groups. Consequently, only the document image 322 (document image of page 2) belongs to a third group in which the third direction has the largest reliability value. A preview image 420c containing the document image of page 2 is created, and is displayed.

In the present embodiment, there is no document image whose fourth direction is a direction of the largest reliability value. Therefore, a preview image 420d is not actually created, and processing is finished.

According to the present embodiment, in a case where the largest reliability value of reliability values determined by the reliability determining section 21 is larger than a threshold value, a document image is not contained in a preview image, and rotation processing is automatically carried out, whereas in a case where the largest reliability value is not more than the threshold value, a preview image containing the document image is displayed. In a case where a plurality of document image are included in a group, the display control section 22 creates a preview image containing only document images whose largest accuracy value is not less than a threshold value and causes the display device 11 to display the preview image. In a case where the largest reliability value of all of the document images contained in the group is larger than the threshold value, all of the document images are subjected to rotation processing, and processing of another group starts without a preview image of the group being displayed. With this arrangement, it is possible (i) to prevent incorrect rotation processing from being automatically carried out and (ii) to save labor and time for a user. Further, since a user checks a smaller number of document images, it becomes easy for the user to check the document images contained in a preview image.

Figure 14:
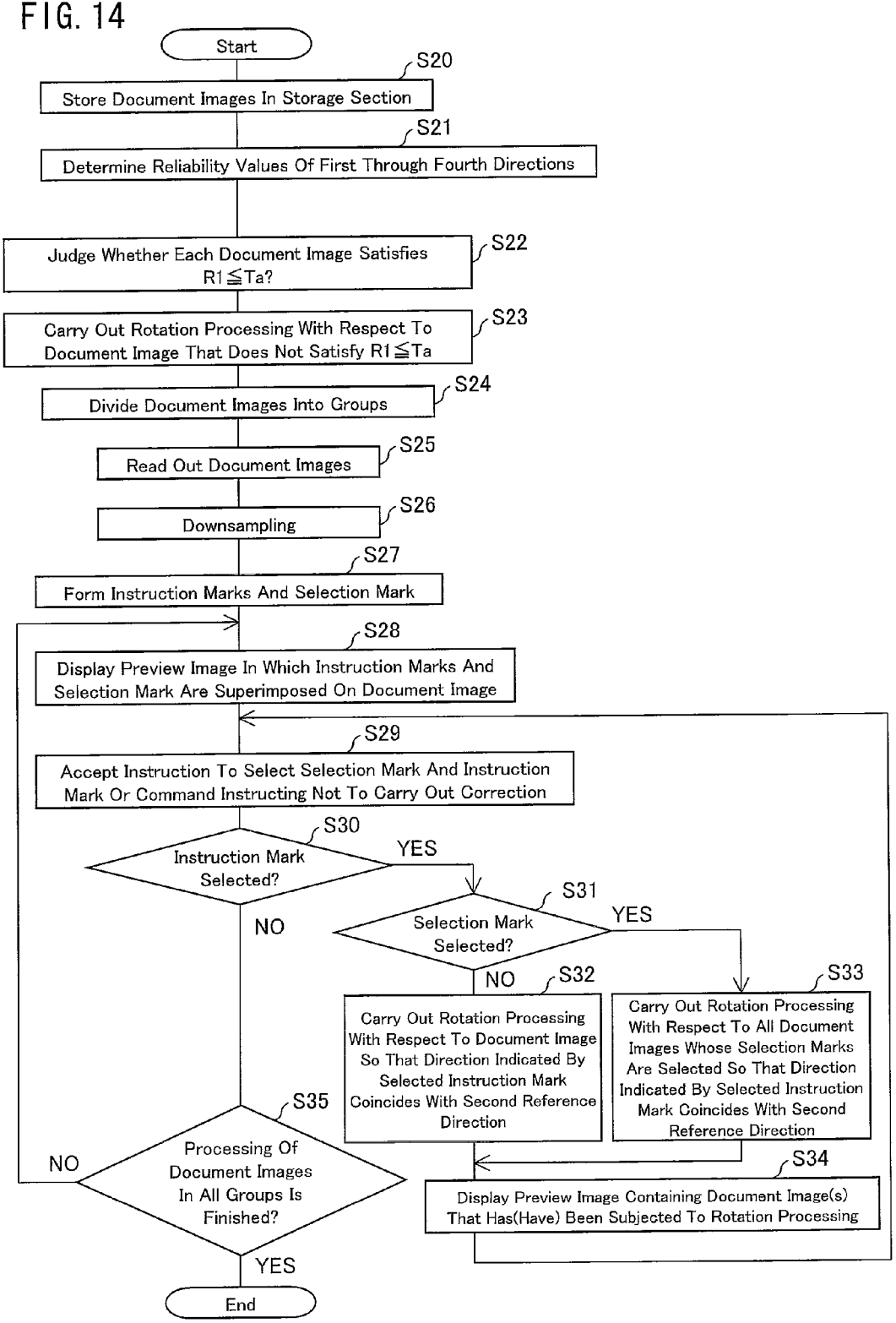
FIG. 14

FIG. 14 is a flow chart showing a flow of processing carried out in the present embodiment. S20 and S21 of FIG. 14 are similar to S1 and S2 of FIG. 6, respectively, and S24 through S35 of FIG. 14 are identical to S3 through S14 of FIG. 6, respectively. Therefore, S20, S21, and S24 through S35 are not explained here in detail.

In the flow of FIG. 14, after S21, a judging section (not shown) determines, as R1, the largest reliability value of reliability values of the first through fourth directions, and judges whether each document image satisfies R1≦Ta (S22). Note that Ta is a threshold value, and is set to 70, for example.

If a document image is judged as not satisfying R1≦Ta in S22, the display control section 22 automatically carries out rotation processing with respect to the document image so that a direction corresponding to the largest reliability value coincides with the second reference direction after the rotation processing (S23). Only document images judged as satisfying R1≦Ta in S22 are divided into groups (S24), and the display control section 22 causes the display device 11 to display preview images of the respective groups one by one (S28) so as to urge a user to input a command indicating that rotation processing is necessary or unnecessary and to input a rotation angle. The rotation processing section 23 then carries out rotation processing with respect to each of the document images so that a direction indicated by an instruction mark selected by the user coincides with the second reference direction after the rotation processing (S32 or 33).

[Embodiment 3]

According to the present embodiment, in a case where a difference between the largest reliability value and the second largest reliability value is large, a preview image is not displayed, and rotation processing is automatically carried out, whereas in a case where the difference between the largest reliability value and the second largest reliability value is small, the preview image is displayed. The following description deals with this embodiment in detail.

In a case where a difference between (i) the largest reliability value (reliability value of a direction that is ranked first in the order of largeness of the reliability value) and (ii) the second largest reliability value (reliability value of a direction that is ranked second in the order of largeness of the reliability value) of reliability values of the first through fourth directions of a document image 300d is small (see FIG. 15), there is a possibility that the document image 300d is an N-up image in which a plurality of information images whose first reference directions are different from one another are shown. Note that the N-up image is image data used in a case where a plurality of (N) document images are printed on a single piece of paper. Further, the first reference direction refers to an upward direction of an information image shown in the document image 300d (direction pointing from a lower side of the information image toward an upper side of the information image) as in the Embodiment 1. In a case where the document image 300d is an N-up image in which a plurality of document images whose first reference directions are different from one another are shown, there is a possibility that rotation processing that is not intended by a user is automatically carried out if rotation processing is automatically carried out so that a direction having the largest reliability value coincides with the second reference direction. That is, in a case where the user hopes that rotation processing is carried out so that a direction having the second largest reliability value coincides with the second reference direction after the rotation processing, rotation processing that is not intended by a user is carried out if rotation processing is carried out so that a direction having the largest reliability value coincides with the second reference direction. In view of this, in a case where the difference between the largest reliability value and the second largest reliability value is not more than a threshold value, a preview image 400d should be displayed (i) so that the user can check orientation of the information image and input a command to carry out rotation processing and (ii) so that rotation processing that is not intended by the user is not automatically carried out.

Figure 16:
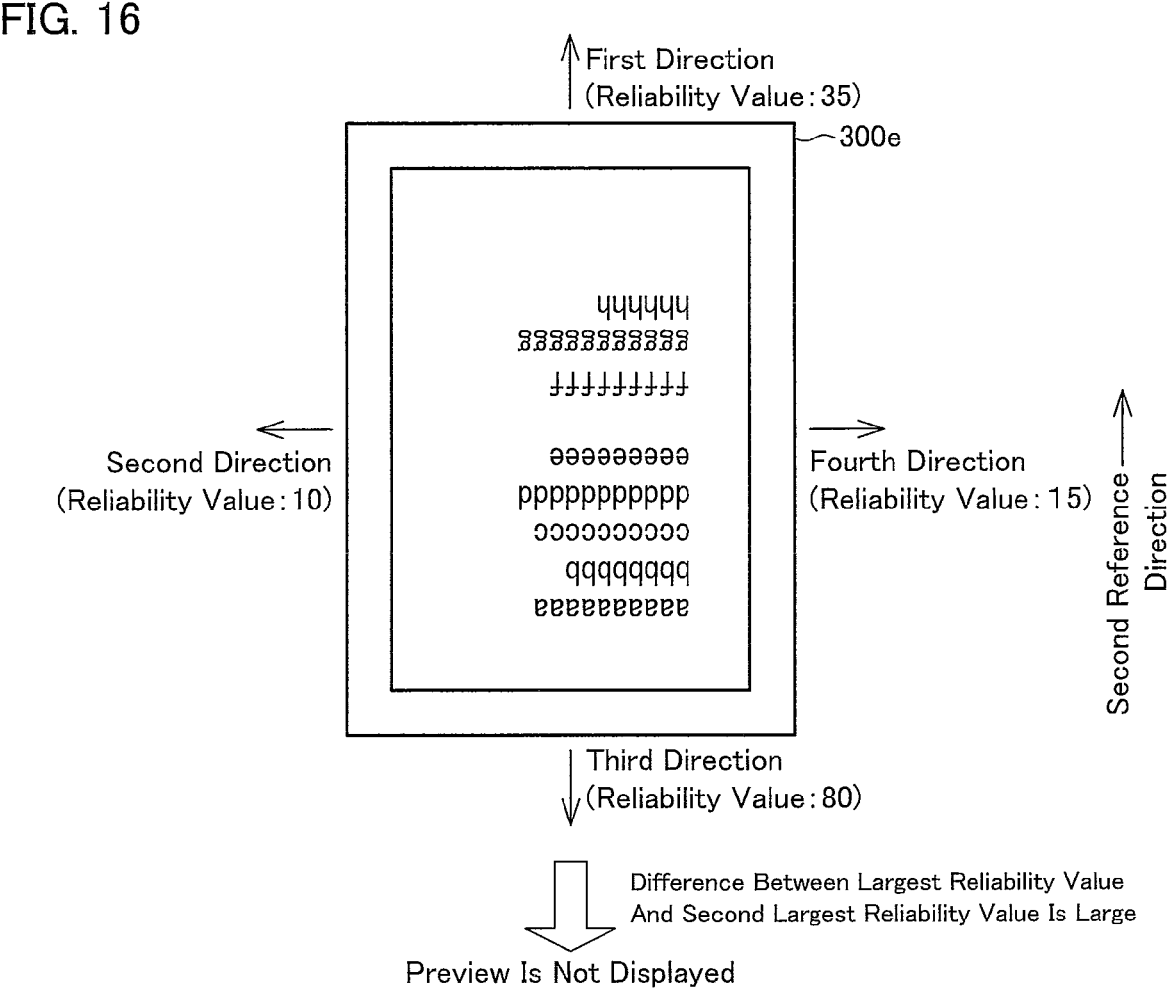
FIG. 16

In contrast, in a case where a difference between the largest reliability value and the second largest reliability value is larger than a threshold value (see FIG. 16), a direction having the largest reliability value almost surely coincides with the first reference direction. Further, in this case, the document image 300d is highly likely an image showing a single information image. Therefore, in this case, a preview image is not displayed, and rotation processing is automatically carried out so that the direction having the largest reliability value coincides with the second reference direction after the rotation processing (see FIG. 15). This saves labor and time for the user.

In view of this, according to the present embodiment, in a case where a difference parameter, which indicates a difference between the largest reliability value of and the second largest reliability value of reliability values determined by the reliability determining section 21, is larger than a threshold value in a document image, the document image is not contained in a preview image, and rotation processing is automatically carried out, whereas the difference parameter is not more than the threshold value, a preview image containing the document image is displayed. This can (i) prevent rotation processing that is not intended by a user from being carried out and (ii) save labor and time for the user.

The following description deals with a case where image data contains a plurality of document images (document images of page 1 through page 6) as shown in FIG. 17. A threshold value is set to 0.35, for example. The largest reliability value of reliability values of the respective first through fourth directions is determined as R1, and the second largest reliability value is determined as R2. R1 and R2 are normalized. The normalized R1 is expressed as R1', and the normalized R2 is expressed as R2'. Note that R1'=R1/R1 is satisfied, and R2'=R2/R1 is satisfied. The difference parameter indicating a difference is R1'-R2'.

The document image of page 1 has a difference parameter of approximately 0.56 which is larger than the threshold value. The document image of page 2 has a difference parameter of 0.4 which is larger than the threshold value. The document image of page 4 has a difference parameter of approximately 0.56 which is larger than the threshold value. The document image of page 5 has a difference parameter of approximately 0.56 which is larger than the threshold value. Therefore, each of the document images of pages 1, 2, 4 and 5 is automatically subjected to rotation processing according to a direction having the largest reliability value. Further, each of the document images of pages 1, 2, 4 and 5 is not contained in any preview image.

Figure 18:
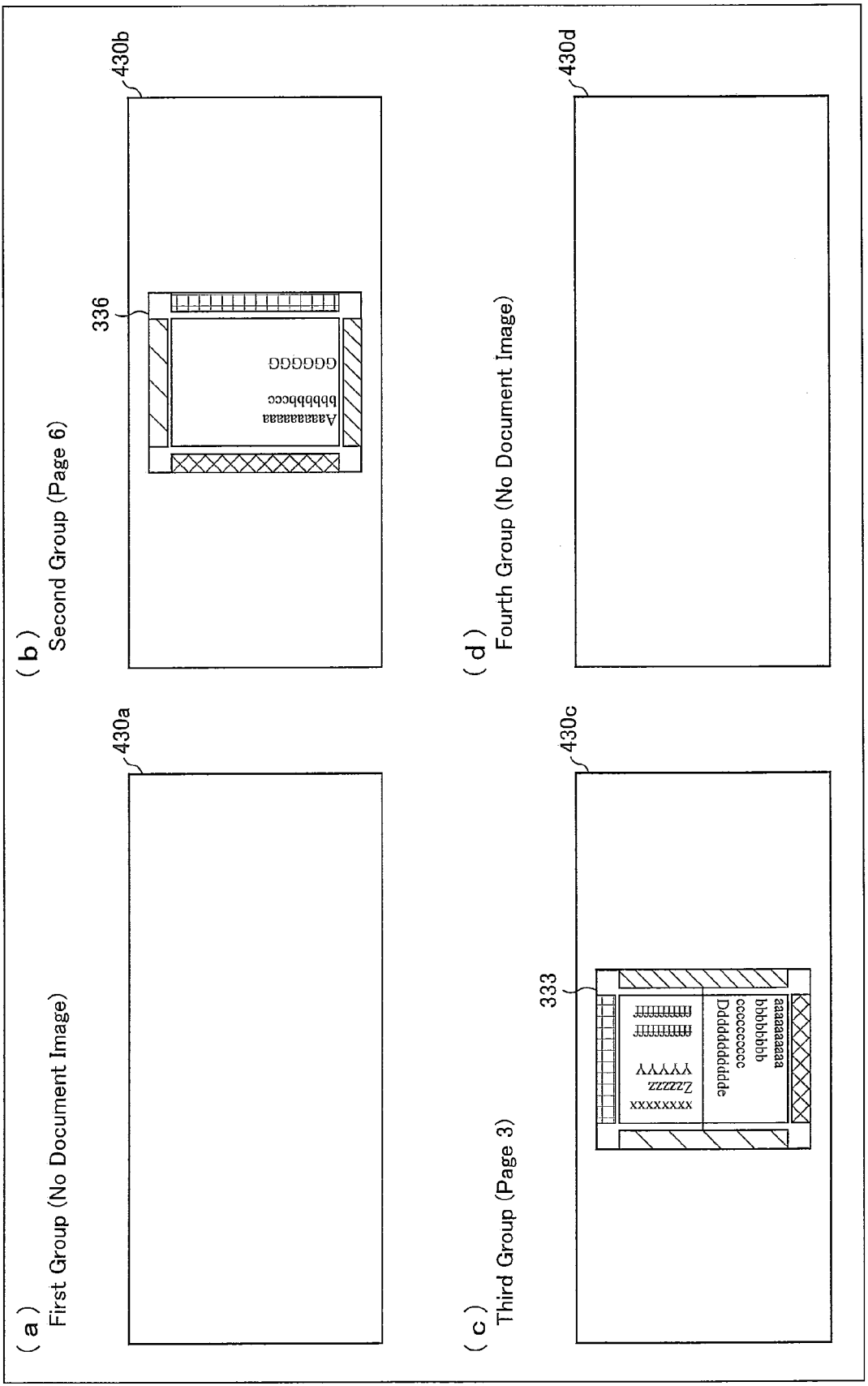
FIG. 18

FIG. 18 is a view showing (i) a preview image of a group in which the first direction has the largest reliability value, (ii) a preview image of a group in which the second direction has the largest reliability value, (iii) a preview image of a group in which the third direction has the largest reliability value, and (iv) a preview image of a group in which the fourth direction has the largest reliability value, in the present embodiment. The document image of page 1 is the only document image whose first direction is a direction of the largest reliability value. However, as for the document image of page 1, a difference parameter, which indicates a difference between the largest reliability value and the second largest reliability value, is larger than the threshold value. Therefore, the document image of page 1 is automatically subjected to rotation processing and is not contained in any groups. Consequently, there is no document image which belongs to a first group in which the first direction has the largest reliability value. Therefore, a preview image 430a is not actually created, and processing of a second group starts.

Each of the document images of pages 4 through 6 is a document image whose second direction is a direction of the largest reliability value. However, as for the document images of pages 4 and 5, a difference parameter, which indicates a difference between the largest reliability value and the second largest reliability value, is larger than the threshold value. Therefore, each of the document images of pages 4 and 5 is automatically subjected to rotation processing and is not contained in any groups. Consequently, only the document image 336 of pages 6 belongs to the second group whose second direction is a direction of the largest reliability value, and a preview image 430b containing the document image of page 6 is created, and is displayed.

Each of the document images of pages 2 and 3 is a document image whose third direction is a direction of the largest reliability value. However, as for the document image of page 2, a difference parameter, which indicates a difference between the largest reliability value and the second largest reliability value, is larger than the threshold value. Therefore, the document image of page 2 is automatically subjected to rotation processing and is not contained in any groups. Consequently, only the document image 333 of page 3 belongs to the third group whose third direction is a direction of the largest reliability value, and a preview image 430c containing the document image of page 3 is created, and is displayed.

In the present embodiment, there is no document image whose fourth direction is a direction of the largest reliability value. Therefore, a preview image 430d is not actually created, and processing is finished.

Figure 19:
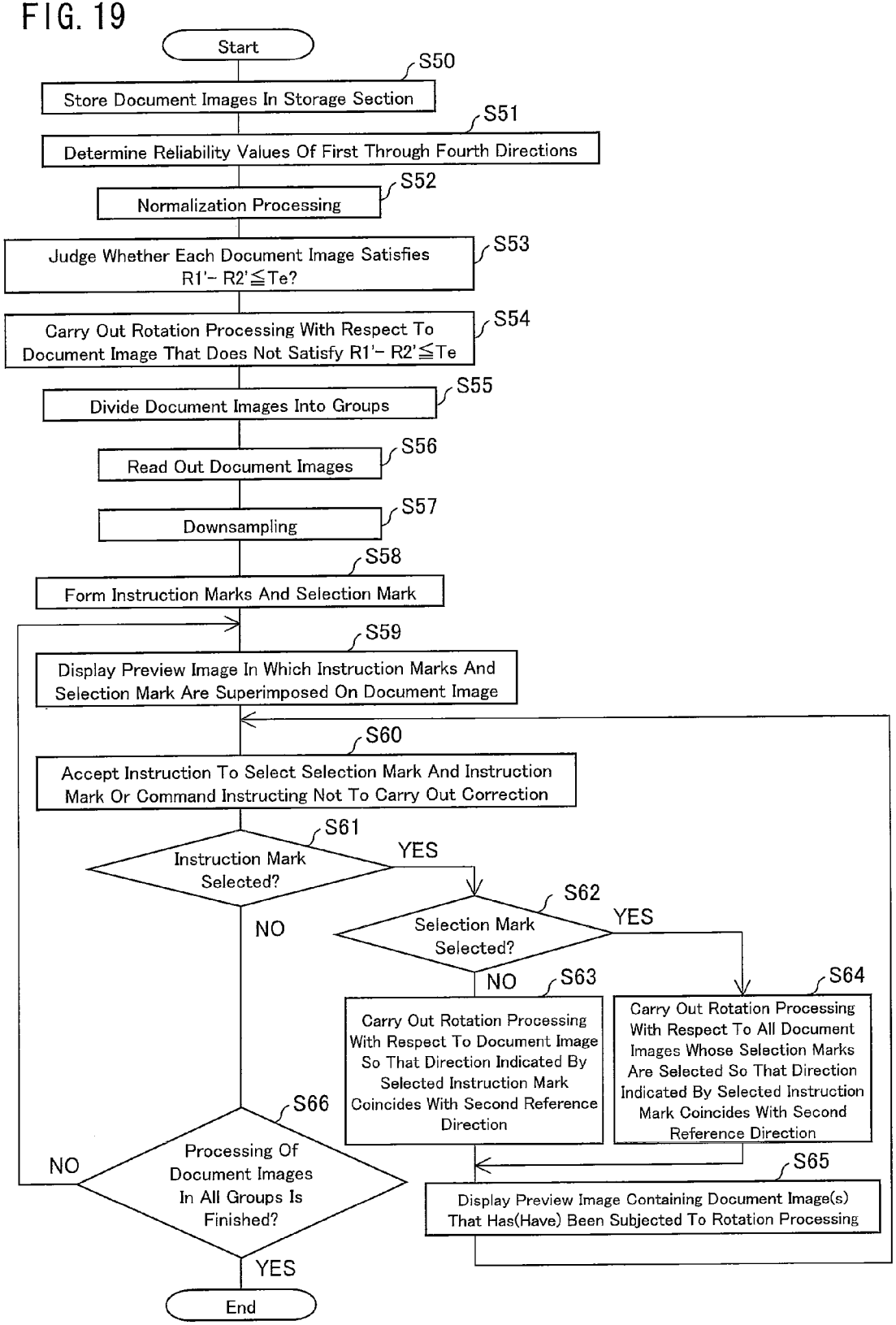
FIG. 19

FIG. 19 is a flow chart showing a flow of processing carried out in the present embodiment. S50 and S51 of FIG. 19 are similar to S1 and S2 of FIG. 6, respectively, and S55 through S66 of FIG. 19 are identical to S3 through S14 of FIG. 6, respectively. Therefore, S50, S51, and S55 through S66 are not explained here in detail.

In the flow of FIG. 19, after S51, a judging section (not shown) determines, as R1, the largest reliability value and determines, as R2, the second largest reliability value of reliability values of the respective first through fourth directions, and then normalizes R1 and R2 (S52). Here, the normalized R1 is expressed as R1', and the normalized R2 is expressed as R2'. Note that R1'=R1/R1 is satisfied, and R2'=R2/R1 is satisfied. The judging section judges whether R1'-R2'≦Te is satisfied or not (S53). Note that Te is a threshold value, and is set to 0.35, for example.

If a document image is judged as not satisfying R1'-R2'≦Te in S53, the rotation processing section 23 automatically carries out rotation processing with respect to the document image so that a direction having the largest reliability value coincides with the second reference direction (S54). Only document images judged as satisfying R1'-R2'≦Te in S53 are divided into groups (S55), and the display control section 22 causes the display device 11 to display preview images of the respective groups one by one (S59) so as to urge a user to input a command indicating that rotation processing is necessary or unnecessary and to input a rotation angle. The rotation processing section 23 then carries out rotation processing with respect to each of the document images so that a direction indicated by an instruction mark selected by the user coincides with the second reference direction (S63 or 64).

Note that, in the procedure of FIG. 19, R1'-R2' of S54 corresponds to a difference parameter indicating a difference between the largest reliability value and the second largest reliability value. Therefore, according to the procedure of FIG. 19, the following processing can be realized. Specifically, in a case where the difference parameter is larger than a threshold value, a preview image is not displayed and rotation processing is automatically carried out, whereas in a case where the difference parameter is not more than the threshold value, the preview image is displayed. Note that the difference parameter is not limited to R1'-R2', but can be R1-R2.

According to the present embodiment, in a case where a document image has a difference parameter larger than a threshold value, a preview image containing the document image is not displayed and rotation processing is automatically carried out, whereas in a case where the difference parameter is not more than the threshold value, the preview image containing the document image is displayed. Note that the difference parameter indicates a difference between the largest reliability value and the second largest reliability value. In the present embodiment, R1−R2 or R1'−R2' is the difference parameter. However, the difference parameter is not limited to R1−R2 or R1'−R2', but can be R1/R2, for example. This is because R1/R2 is a value which becomes larger as a difference between the largest reliability value and the second largest reliability value becomes larger, and therefore corresponds to the difference parameter.

[Embodiment 4]

According to the procedure shown in FIG. 14, a preview image can be displayed as for a document image in which an information image has a small number of characters, but a preview image cannot be displayed as for an N-up image in which a plurality of information images whose first reference directions are different from one another are shown. In contrast, according to the procedure shown in FIG. 19, a preview image can be displayed as for an N-up image in which a plurality of information images whose first reference directions are different from one another are shown, but a preview image cannot be displayed as for a document image in which an information image has a small number of characters.

In view of this, the procedure of FIG. 14 and the procedure of FIG. 19 are combined. This makes it possible to display a preview image of both of (i) a document image in which an information image has a small number of characters and (ii) an N-up image in which a plurality of information images whose first reference directions are different from one another are shown.

The following description deals with processing carried out in a case where the procedure of FIG. 14 and the procedure of FIG. 19 are combined.

Figure 20:
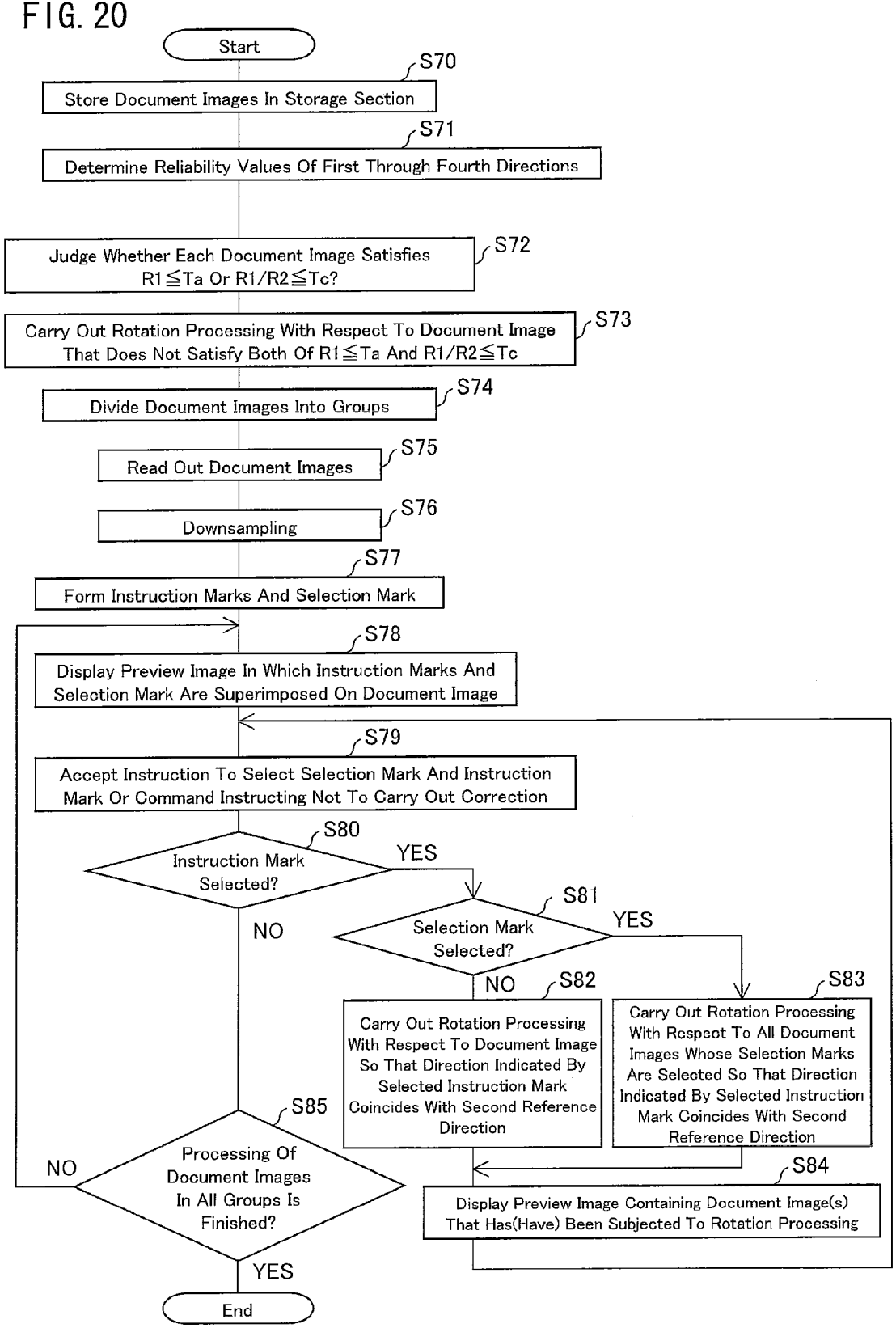
FIG. 20

FIG. 20 is a flow chart showing a flow of processing carried out in a case where the procedure of FIG. 14 and the procedure of FIG. 19 are combined. Note, however, that the difference parameter in the processing of FIG. 19 is set as R1/R2. S70 and S71 of FIG. 20 are similar to S1 and S2 of FIG. 6, respectively, and S74 through S85 of FIG. 20 are identical to S3 through S14 of FIG. 6, respectively. Therefore, S70, S71, and S74 through S85 are not explained here in detail.

In the flow of FIG. 20, after S71, a judging section (not shown) determines, as R1, the largest reliability value and determines, as R2, the second largest reliability value of reliability values of the first through fourth directions, and then judges whether each document image satisfies R1≦Ta or R1/R2≦Tc (S72).

If a document image is judged as not satisfying both of R1≦Ta and R1/R2≦Tc in S72, the rotation processing section 23 automatically carries out rotation processing with respect to the document image so that a direction having the largest reliability value coincides with the second reference direction (S73). Only document images judged as satisfying R1≦Ta and R1/R2≦Tc in S72 are divided into groups (S74), and the display control section 22 causes the display device 11 to display preview images of the respective groups one by one (S78) so as to urge a user to input a command indicating that rotation processing is necessary or unnecessary and to input a rotation angle. The rotation processing section 23 then carries out rotation processing with respect to each of the document images so that a direction indicated by an instruction mark selected by the user coincides with the second reference direction (S82 or S83).

[Embodiment 5]

According to the present embodiment, a preview image of a document image which has been subjected to provisional rotation processing is displayed on the display device 11, the provisional rotation processing being carried out so that a direction having the largest reliability value of the first through fourth directions coincides with a second reference direction. Note that the second reference direction is an upward direction of the document image, and is an upward direction of a display screen of the display device 11.

According to this embodiment, before actual rotation processing is carried out, a user can check a preview image so as to confirm how a document image that has been subjected to the actual rotation processing looks like, the actual rotation processing being carried out so that a direction having the largest reliability value coincides with the second reference direction.

Figure 21:
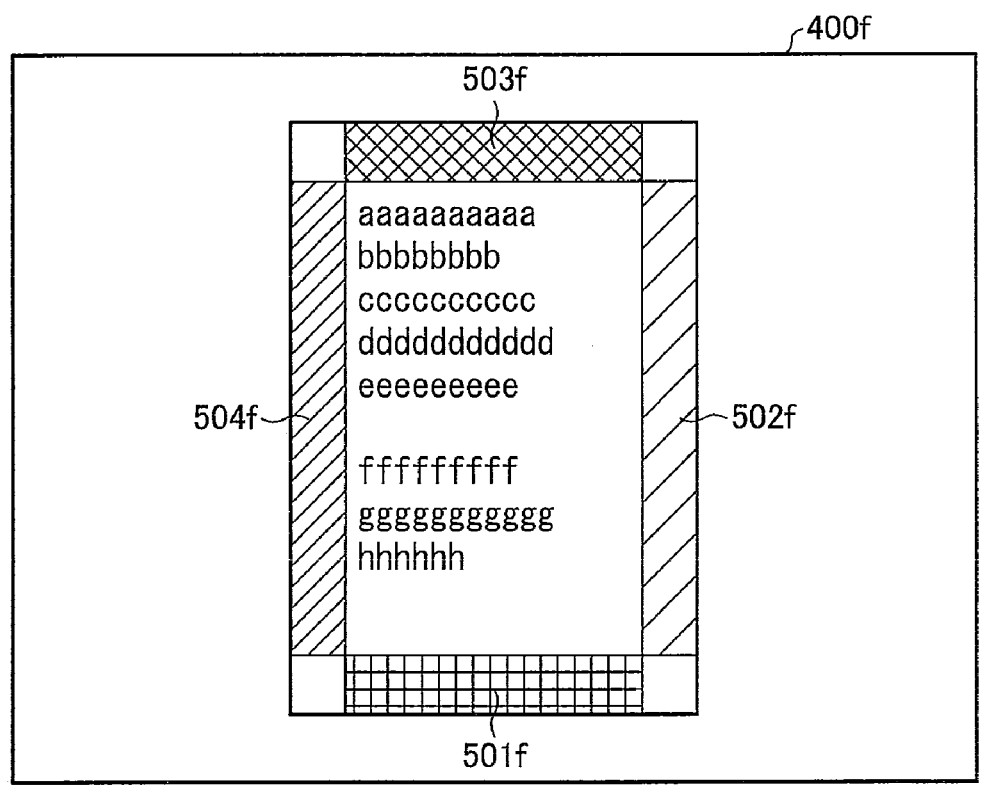
FIG. 21

For example, FIG. 21 shows a preview image 400f which corresponds to the document image 300 shown in FIG. 2(a). The preview image 400f shows the document image 300 that has been subjected to provisional rotation processing at a rotation angle of 180° so that a first reference direction (upward direction of an information image) of the information image shown in the preview image 400f coincides with a second reference direction (upward direction of the display screen). A user can check the preview image 400f so as to confirm how an image that has been subjected to rotation processing so that a direction having the largest reliability value coincides with the second reference direction looks like. With this arrangement, the first reference direction of a document image shown in a preview image highly likely coincides with the second direction (that is, the document image highly likely has orientation desired by a user). This allows the user to easily check orientation of a document image, and a user has less opportunity to instruct rotation processing at rotation angles other than 0°. This saves labor and time for the user.

Figure 22:
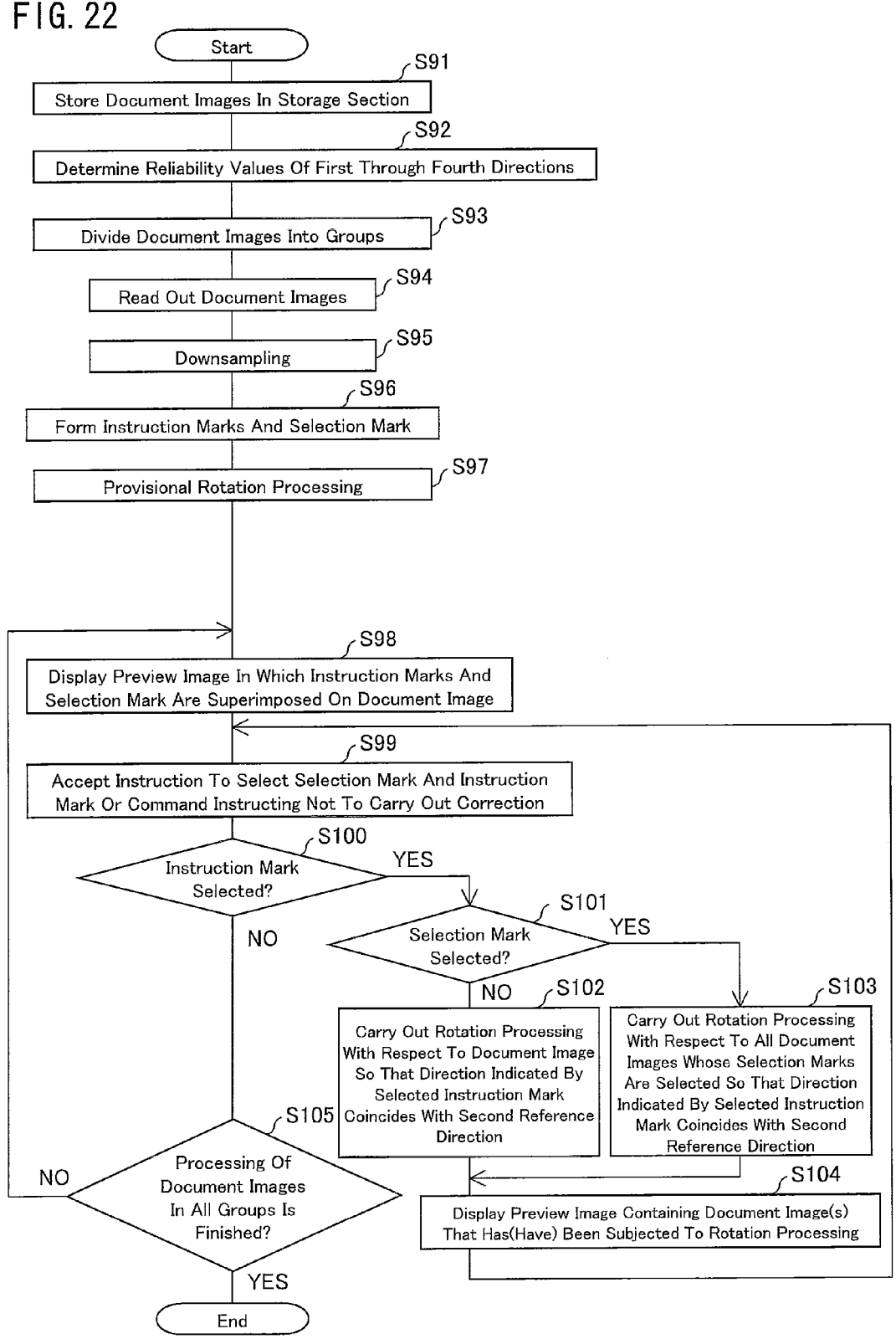
FIG. 22

FIG. 22 is a flow chart showing a flow of processing carried out in the present embodiment. S91 through S96 of FIG. 22 are similar to S1 through S6 of FIG. 6, respectively, and S98 through S105 of FIG. 22 are identical to S7 through S14 of FIG. 6, respectively. Therefore, S91 through S96 and S98 through S105 are not explained here in detail.

In the flow of FIG. 22, after S96, the display control section 22 carries out provisional rotation processing with respect to instruction marks of the respective first through fourth directions and a document image so that a direction having the largest reliability value of the first through fourth directions coincides with the second reference direction (S97), the instruction marks being formed in S96 and the document image having been subjected to downsampling in S95. The display control section 22 causes the display device 11 to display a preview image in which the instruction marks and the document image which have been subjected to the provisional rotation processing are superimposed (S98). S98 through S105 are carried out in a similar manner to S7 through S14 of the Embodiment 1, respectively. In a case where a user selects one of the instruction marks ("Yes" in S100), rotation processing corresponding to the selected instruction mark is again carried out with respect to the document image that has not been subjected to the downsampling (S102 or S103). Also in this case, document images are divided into groups before provisional rotation processing is carried out, and the display control section 22 causes the display device 11 to display, as preview images, the document images, that have been subjected to the provisional rotation processing, for each of the groups.

In the present embodiment, provisional rotation processing is carried out with respect to a document image that has been subjected to the downsampling, and a preview image of the document image is displayed (S98). However, this is not the only possibility. It is also possible that (i) rotation processing is carried out with respect to a document image, that has not been subjected to the downsampling, so that a direction corresponding to the largest reliability value coincides with the second reference direction, (ii) the downsampling and instruction mark forming processing are carried out with respect to the document image that has been subjected to the rotation processing, and (iii) a preview image of the document image is displayed so that a user can confirm the document image and input a command to carry out further processing.

Note that, in the Embodiments 1 through 5 described above, the control section 13 detects a document size and a document orientation (A4 placed horizontally, A4 placed vertically, or a document in which a variety of document sizes exist (if an ADF (Auto Document Feeder) is used), for example), and if it is determined that the document size or the document orientation is correct, it is possible to finish the processing without a preview image being displayed on the display device 11. The reason is that, for example, there may be a case where a vertically-written A4 document includes a horizontally-written A4 chart or diagram, and in such a case, the rotation processing is unnecessary.

The detection of the document size is carried out as described below. In a case where a document is placed and read on a scanner platen, the following method may be adopted, that is, a method in which a photoelectric conversion element (such as a photo transistor) arranged in the image input apparatus detects a document size in a main scanning direction and a sub scanning direction, for example. Alternatively, a user may input a selection via an operation panel so as to determine a document size. Further, in a case where a document is read from the ADF, an image region (the number of pixels) in the main scanning direction and the sub scanning direction of a scanned document image is detected based on output from an image sensor, such as a CCD (Charge Coupled Device) included in the image input apparatus, and a document size is then detected based on the image region (the number of pixels).

[Image Forming Apparatus]

Figure 23:
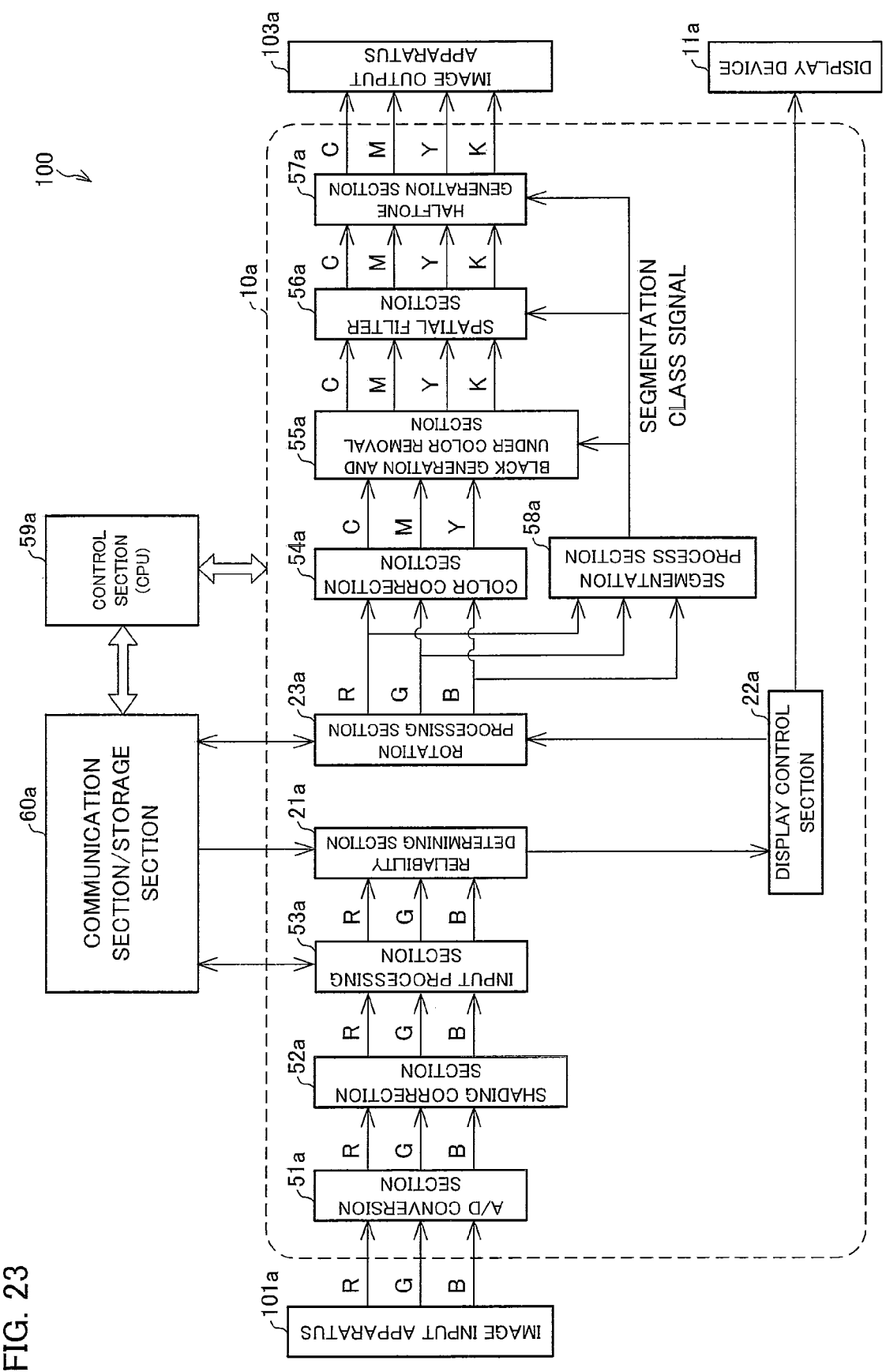
FIG. 23

The following description deals with an image forming apparatus 100 including an image processing apparatus 10a which is a modification of the image processing apparatus 10 shown in FIG. 1. FIG. 23 is a block diagram showing the image forming apparatus (a digital copying machine or a multifunction printer) 100. The multifunction printer has a function of a copying machine, a function of a printer, a function of fax transmission, and a function of scanning to e-mail, for example.

An image input apparatus 101a is constituted by a CCD (Charge Coupled Device) line sensor, and converts light reflected from a document into an electric signal indicating each color component of R, G, and B (R: red, G: green, B: blue) of the light. The color image signal (RGB analogue signals) generated by the image input apparatus 101a is converted into a digital signal in an A/D (analogue-to-digital) conversion section 51a, and then various distortion generated in an illumination system, an image focusing system, and an image sensing system of the image input apparatus 101a is removed in a shading correction section 52a. After that, processing, such as gamma correction processing, is carried out with respect to each of the RGB signals in an input processing section 53a.

The data outputted from the input processing section 53a is received by a communication section/storage section 60a. A reliability determining section 21a determines reliability values of first through fourth directions of a document image 300 based on the image data (data of the document image) stored in the communication section/storage section 60a. A display control section 22a obtains data of the document image 300 from the reliability determining section 21a, and creates, based on the data of the document image 300 and the reliability values, a preview image 400 in which instruction marks 501 through 503 are superimposed on the document image 300. The display control section 22a then causes a display device 11a to display the preview image 400. Note that the display device 11a is an apparatus, which displays an image and which is provided on an operation panel of the image forming apparatus 100, such as liquid crystal display.

If a user selects one of the instruction marks 501 through 504, the display control section 22a transmits information of the instruction mark selected by the user to a rotation processing section 23a. The rotation processing section 23a reads out the data of the document image 300 stored in the communication section/storage section 60a, sets a rotation angle based on the selected instruction mark, and carries out rotation processing with respect to the document image 300. Further, the rotation processing section 23a overwrites document image 300 stored in the communication section/storage section 60a with the document image 300 (RGB signals) that has been subjected to the rotation processing, and transmits the document image 300 that has been subjected to the rotation processing to a color correction section 54a.

The color correction section 54a converts the RGB signals transmitted from the rotation processing section 23a into CMY (C: cyan, M: magenta, Y: yellow) signals (which are complementary colors of the RGB signals), and carries out processing of improving color reproducibility. In a black generation and under color removal section 55a, the CYM signals are converted into four CMYK (K: black) signals.

With respect to the CMYK signals, edge enhancement (sharpening) processing, smoothing processing, and the like are carried out in a spatial filter section 56a, and then, tone reproduction processing for outputting an image is carried out in a halftone generation section 57a.

Meanwhile, in a segmentation process section 58a, it is determined which region (a black text, a color text, a halftone dot, or a photograph (a continuous tone image region), for example) each pixel of the image data belongs to. The segmentation process section 58a outputs segmentation class signal indicating a determined result. The segmentation class signal outputted from the segmentation process section 58a is supplied to the black generation and under color removal section 55a, the spatial filter section 56a, and the halftone generation section 57a. In the black generation and under color removal section 55a, the spatial filter section 56a, and the halftone generation section 57a, the processing is appropriately selected in accordance with various regions.

The halftone generation section 57a outputs the CMYK signals to an image output apparatus 103a, and then an output image is formed. The image output apparatus 103a is an apparatus for printing an image for an electrophotographic printer or an ink jet printer, for example.

According to the above arrangement, the reliability determining section 21a obtains image data (data of a scanned image) from the communication section/storage section 60a. However, the reliability determining section 21a can obtain the image data directly from the input processing section 53a. Further, according to the above arrangement, data of a scanned image that has been subjected to rotation processing in the rotation processing section 23a can be converted into, for example, a PDF file format, and can be transferred to, via a network or a communication line, an external connection apparatus or a communication line.

Further, according to the above arrangement, data of the scanned image that has been subjected to rotation processing in the rotation processing section 23a can be managed as filing data. In this case, the data of the scanned image is stored in such a manner that the data is encoded into a JPEG code based on a JPEG compressing algorithm, for example. Then, in a case where a copy output operation or a print output operation is inputted, the JPEG code is extracted from a hard disc. After that, the JPEG code is received by a JPEG decoding section, and is decoded so as to be converted into RGB data.

Meanwhile, in an image transmission operation, the JPEG code is extracted from the hard disc, and then is transferred to, via a network or a communication line, an external connection apparatus or a communication line. A control section 59a manages the filing data, and controls operation of transferring data.

[Image Reading Apparatus]

Figure 24:
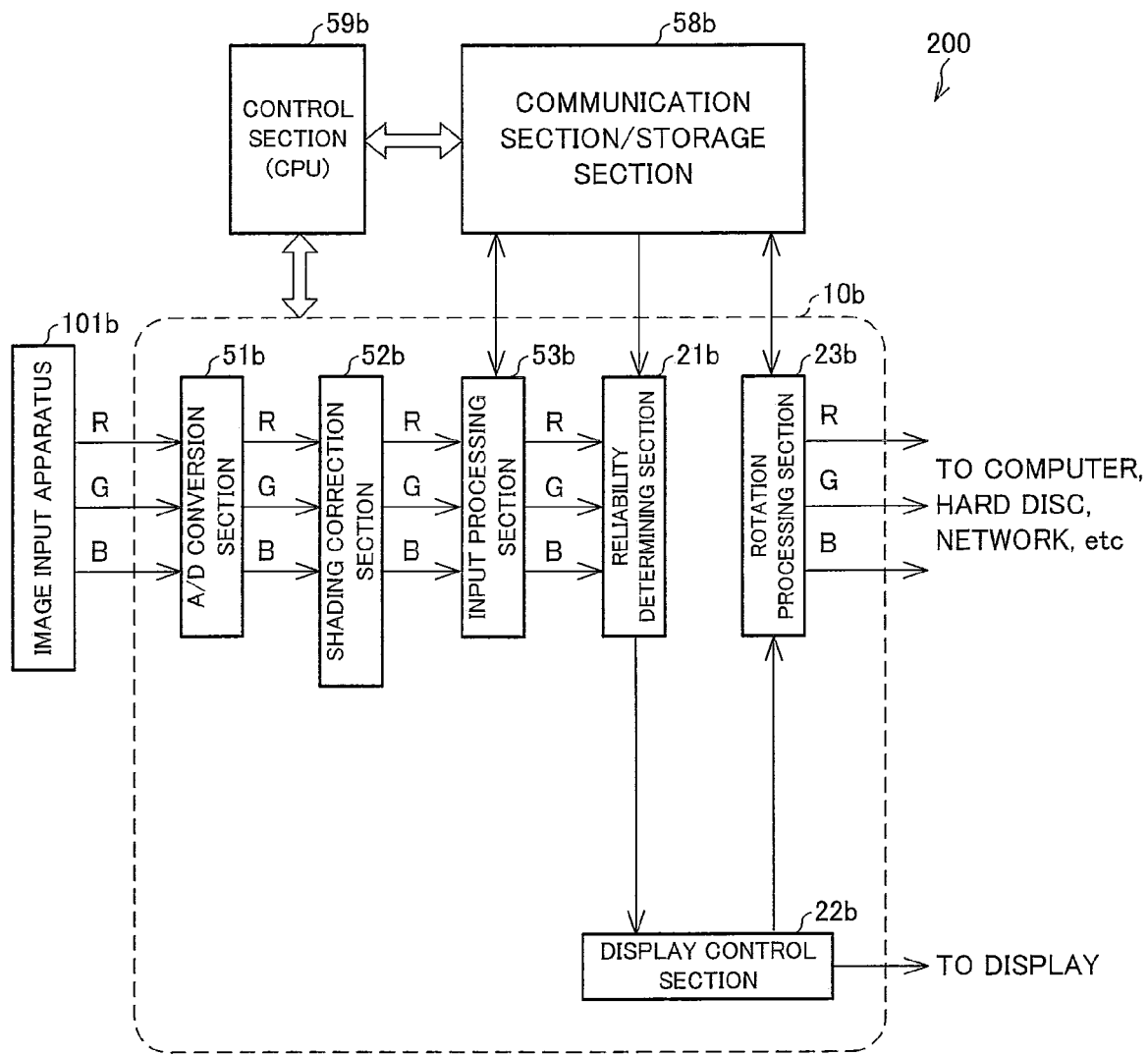
FIG. 24

The following description deals with an image reading apparatus 200 including an image processing apparatuses 10b which is a modification of the image processing apparatus 10 shown in FIG. 1. FIG. 24 is a view showing an arrangement of the image processing apparatus 10b used in a color image reading apparatus (scanner) of the present embodiment.

The image reading apparatus 200 includes an image input apparatus 101b, and the image processing apparatus 10b, a control section 59b, a communication section/storage section 58b. The image processing apparatus 10b includes an A/D conversion section 51b, a shading correction section 52b, an input processing section 53b, a reliability determining section 21b, a rotation processing section 23b, and a display control section 22b.

The processing carried out in the image input apparatus 101b, the A/D conversion section 51b, the shading correction section 52b, the input processing section 53b, the reliability determining section 21b, the rotation processing section 23b, and the display control section 22b is the same as the processing carried out in the image input apparatus 101a, the A/D conversion section 51a, the shading correction section 52a, the input processing section 53a, the reliability determining section 21a, the rotation processing section 23a, and the display control section 22a shown in FIG. 21.

After being processed in various processing sections of the image processing apparatus 10b, the RGB image signals are outputted to a computer, a hard disk, or a network, for example. Further, a display control section 22b creates a preview image 400 in which instruction marks 501 through 504 are superimposed on a scanned image, and causes a display device to display the preview image 400. Note that the display device may be a display panel provided separately from the image reading apparatus 200 or may be a display panel provided in the image reading apparatus 200.

[Image Input Apparatus]

The following description deals with said image input apparatuses 101a and 101b. Since the image input apparatuses 101a and 101b have the same arrangement, hereinafter, the image input apparatuses 101a and 101b are referred to as "image input apparatus 101".

Figure 25:
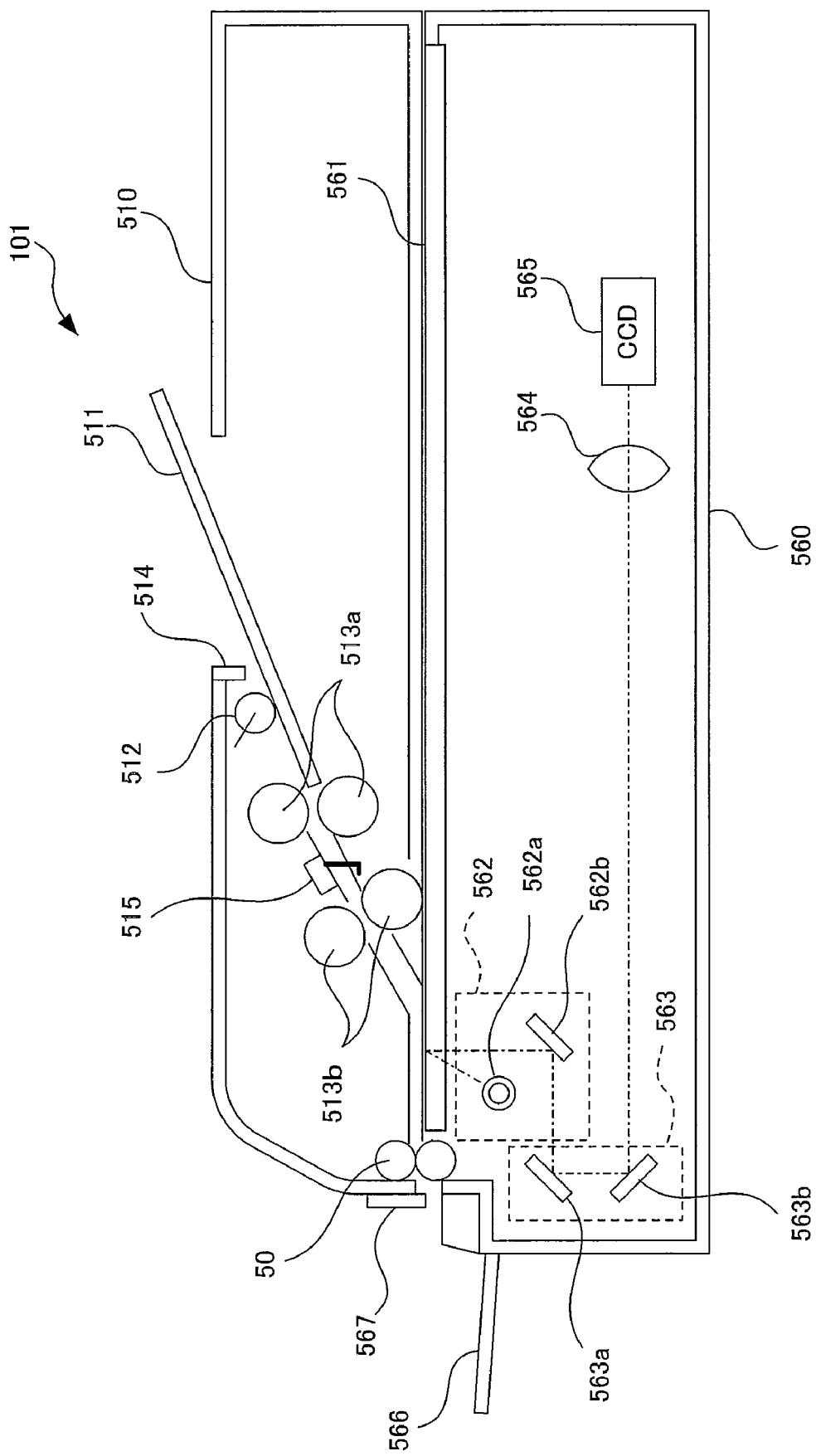
FIG. 25

FIG. 25 is a view schematically illustrating an arrangement of the image input apparatus 101. The image input apparatus 101 includes: a document feeding section provided in an upper housing 510; a scanner section provided in a lower housing 560; and the like. The upper housing 510 includes: a document set sensor 514 for detecting a document placed on a document tray 511; a pick-up roller 512 for conveying documents one by one; conveyance rollers 513a and 513b for conveying a document so that an image of the document is read; a document output roller 50 for outputting a document; a document output tray 566 on which an outputted document is placed; a document output sensor 567 for detecting an outputted document; and the like. The conveyance roller 513b functions as an alignment roller for adjusting an orientation of a sheet. A driving shaft of the conveyance roller 513b includes an electromagnetic clutch (not illustrated). A control circuit (not illustrated) controls the electromagnetic clutch so as to control transfer of driving force from a drive motor (not illustrated) to the conveyance roller 513b. In a case where no document is provided, the conveyance roller 513b is not in operation. If a front end of a document touches a feeding timing sensor 515, and a predetermined signal is transferred from the sensor to the control circuit, the conveyance roller 513b starts its rotation operation so as to transport the document in a direction from the document tray 511 to the output tray 566. The conveyance roller 513b is set such that, when (i) a document is transported from an upstream section, and a front end of the document is pressed against a nip section of the conveyance roller 513b that is not in operation, and (ii) the document is bent, the conveyance roller 513b starts its rotation operation. This corrects a position of the document in such a manner that the nip section of the conveyance roller 513b causes the front end of the document to be perpendicular to a conveyance direction.

The lower housing 560 includes: scan units 562 and 563 which reciprocate along a lower surface of a scanner platen 561; an imaging lens 564; a CCD line sensor 565 which is a photoelectric conversion element; a paper output tray 566; and the like.

The scan unit 562 includes: a light source 562a (a halogen lamp, for example) for irradiating light toward a document conveyed from the document tray 511, or a document placed on the scanner platen 561; a mirror 562b for leading light reflected from the document to a predetermined light path; and the like. Further, the scan unit 563 includes mirrors 562a and 563b for leading, toward the CCD line sensor 565, the light that was reflected from the document and then lead by the mirror 562b to the predetermined light path.

The imaging lens 564 leads the reflected light from the scan unit 563 and forms an optical image on a predetermined position on the CCD line sensor 565. The CCD line sensor 565 carries out the photoelectric conversion with respect to the formed light image, and outputs an electric signal. In other words, the CCD line sensor 565 outputs, to the image processing apparatuses 10a and 10b, data that has been color-separated into each of color components R (red), G (green), and B (blue) in accordance with a color image read from the document (a surface of the document, for example).

[Program]

The present embodiment can be realized by storing, in a computer-readable recording medium that stores a program code (an execution format program, an intermediate code program, a source program) to be carried out by a computer, a program indicating the processing carried out by the reliability determining section 21, the display control section 22, and the rotation processing section 23 shown in FIG. 1. As a result, it becomes possible to provide a portable recording medium in which the program for carrying out the processing that is carried out by the reliability determining section 21, the display control section 22, and the rotation processing section 23.

In the present embodiment, the recording medium may be a program medium such as a memory (not illustrated) (e.g. ROM) used in processing carried out by a microcomputer, or such a program medium that (i) a program reading apparatus is provided an external storage apparatus (not illustrated), and (ii) the recording medium is inserted into the program reading apparatus so that the program is read. In any cases, it is possible to have an arrangement in which a microprocessor accesses the program code so as to perform the program code. Alternatively, in any cases, it is possible to have an arrangement in which (i) the program code is read out and downloaded to a program storage area (not illustrated) of a microcomputer, and (ii) the program code is performed. The program for downloading the program code is stored in a main apparatus in advance.

Here, the program medium may be a recording medium that is arranged separable from the main apparatus. The program medium may be a medium in which a program code is supported and fixed, such as: a tape (such as a magnetic tape or a cassette); a disc such as a magnetic disk (a floppy (registered trademark) disk, or a hard disk, for example) or an optical disk (a CD-ROM, an MO, an MD, or a DVD, for example); a card (such as an IC card (including a memory card) or an optical card); and a semiconductor memory (such as a mask ROM, an EPROM (Erasable Programmable Read Only Memory), an EEPROM (Electrically Erasable Programmable Read Only Memory), or a flash ROM).

Further, in the present embodiment, a system is arranged such that (i) the system can be connected to a communication network including the Internet, and (ii) the program code may be supported but not fixed in a medium (the program code may be downloaded from a communication network, for example). In the case where the program code is downloaded from a communication network, the program for downloading the program code may be stored in the main apparatus in advance, or may be installed from another recording medium to the main apparatus. Further, the present invention can be realized in a form of a computer data signal that is realized by electronic transmission of the program code, and embedded in a carrier wave. The program stored in the recording medium is read out by a program reading apparatus included in a digital color image forming apparatus or a computer system, so that the reliability determining section 21, the display control section 22, and the rotation processing section 23 can be realized.

A computer system includes: an image input apparatus (such as a flat head scanner, a film scanner, or a digital camera); a computer in which a predetermined program is loaded so as to carry out various processing (said image processing method, for example); an image display device (such as a CRT display or a liquid crystal display) for displaying a result of processing of a computer; and a printer for outputting the result of the processing of the computer on paper or the like. The computer system further includes communication means (such as a network card or a modem) for connecting the computer system to a server or the like via a network.

As described above, an image processing apparatus of the present invention for processing a plurality of document images contained in inputted image data, each of the plurality of document images containing an information image which provides a user with information, said image processing apparatus, includes: a reliability determining section which determines, with respect to each of the plurality of document images, reliability of coincidences of respective predetermined directions with a first reference direction, the first reference direction being a predetermined direction which points on a basis of an upward direction of or a downward direction of the information image; and a display control section (i) which divides the plurality of document images into groups so that document images, having a same direction whose reliability value is the highest, belong to a same group, and (ii) which causes a display device to display preview images for the respective groups, each of the preview images indicating at least one document image in each of the groups.

In a case where a plurality of document images are included in a single group, it is preferable that the display control section causes the display device to display a preview image containing the plurality of document images included in the group.

According to the arrangement, in which in a case where a plurality of document images are processed, the plurality of document images are divided into groups so that a document image(s), having the same direction whose reliability is the highest, belong to the same group, it is possible to check a preview image for each of the groups. With this arrangement, a plurality of document images contained in a preview image highly likely coincide with each other in first reference direction. In a case where many of the plurality of document images contained in the preview image coincide with each other in first reference direction, a document image which is different from the other document images in first reference direction is noticeable and a user therefore can easily find such a document image even if the size of the preview image is small. Therefore, the user can easily check page orientation of a plurality of document images contained in inputted image data.

The direction predetermined on the basis of an upward direction of or a downward direction of the information image refers to a predetermined direction of directions radially extending from, for example, a center of the information image. For example, such a direction refers to a direction extending from the center of the information image toward any one of upward, downward, leftward, rightward directions of the information image.

Further, the image processing apparatus of the present invention may be an image processing apparatus for processing a plurality of document images contained in inputted image data, each of the plurality of document images containing an information image which provides a user with information, said image processing apparatus, includes: a reliability determining section which determines, with respect to each of the plurality of document images, reliability of coincidences of respective predetermined directions with a first reference direction, the first reference direction being a predetermined direction which points on a basis of an upward direction of or a downward direction of the information image; a judging section which compares a highest one of the reliability values of the respective directions with a first threshold value so as to determine whether or not each of the plurality of document images satisfies a first condition in which the highest reliability value is smaller than the first threshold value, the reliability values being obtained by the reliability determining section, and a display control section which divides document images, that are determined to satisfy the first condition, into groups so that document images, having a same direction whose reliability value is the highest, belong to a same group, and which causes the display device to display preview images for the respective groups.

According to the arrangement, in a case where a plurality of document images are processed, the image processing apparatus can precisely recognize page orientation of an information image of a document image whose largest reliability value is larger than the first threshold value. With respect to such a document image, the image processing apparatus can automatically carry out processing according to the direction having the largest reliability value, for example. The processing according to the direction having the largest reliability value is, for example, rotation processing carried out so that the direction having the largest reliability value coincides with a predetermined direction. Further, such processing may be carried out by another processing apparatus (e.g. server) which is connected to the image processing apparatus and receives the image data, a judged result, and the like. With the arrangement, it is possible to spare a user the trouble of carrying out processing with respect to document images in which a direction having the highest reliability highly likely coincides with the first reference direction. Further, document images whose largest reliability value is not more than the first threshold value are divided into groups so that a document image(s), having the same direction whose reliability is the highest, belong to the same group, and a preview image is displayed for each of the groups. This allows a user to check a smaller number of document images, and therefore allows the user to easily check a plurality of document images shown in a preview image. Further, since the user checks the document images whose largest reliability value is not more than the first threshold value, a problem that incorrect processing is automatically carried out with respect to the document images can be avoided.

Further, the image processing apparatus of the present invention may be an image processing apparatus for processing a plurality of document images contained in inputted image data, each of the plurality of document images containing an information image which provides a user with information, said image processing apparatus, includes: a reliability determining section which determines, with respect to each of the plurality of document images, reliability of coincidences of respective predetermined directions with a first reference direction, the first reference direction being a predetermined direction which points on a basis of an upward direction of or a downward direction of the information image; a judging section which compares a difference parameter with a second threshold value so as to determine whether or not each of the plurality of document images satisfies a second condition in which the difference parameter is not more than the first threshold value, the difference parameter indicating a difference between a highest one of and a second highest one of the reliability values obtained by the reliability determining section; and a display control section which divides document images, that are determined to satisfy the second condition, into groups so that document images, having a same direction whose reliability value is the highest, belong to a same group, and which causes the display device to display preview images for the respective groups.

According to the arrangement, in a case where a plurality of document images are processed, the image processing apparatus can precisely recognize page orientation of an information image of a document image in which a difference parameter is larger than the second threshold value. Note that the difference parameter indicates a difference between the largest reliability value of and the second largest reliability of the reliability values. With respect to such a document image, the image processing apparatus can automatically carry out processing according to the direction having the largest reliability value, for example. The processing according to the direction having the largest reliability value is, for example, rotation processing carried out so that the direction having the largest reliability value coincides with a predetermined direction. Further, such processing may be carried out by another processing apparatus (e.g. server) which is connected to the image processing apparatus and receives the image data, a judged result, and the like. With the arrangement, it is possible to spare a user the trouble of carrying out processing with respect to document images in which a direction having the highest reliability highly likely coincides with the first reference direction. Further, document images in which the difference parameter is not more than the second threshold value are divided into groups so that a document image(s), having the same direction whose reliability is the highest, belong to the same group, and a preview image is displayed for each of the groups. This allows a user to check a smaller number of document images, and therefore allows the user to easily check a plurality of document images shown in a preview image. Further, since the user checks the document images in which the difference parameter is not more than the second threshold value, a problem that incorrect processing is automatically carried out with respect to the document images can be avoided.

Further, the image processing apparatus of the present invention may be an image processing apparatus for processing a plurality of document images contained in inputted image data, each of the plurality of document images containing an information image which provides a user with information, said image processing apparatus, includes: a reliability determining section which determines, with respect to each of the plurality of document images, reliability of coincidences of respective predetermined directions with a first reference direction, the first reference direction being a predetermined direction which points on a basis of an upward direction of or a downward direction of the information image; a judging section (i) which compares a highest one of the reliability values of the respective directions with a first threshold value so as to determine whether or not each of the plurality of document images satisfies a first condition in which the highest reliability value is smaller than the first threshold value, the reliability values being obtained by the reliability determining section, and (ii) which compares a difference parameter with a second threshold value so as to determine whether or not each of the plurality of document images satisfies a second condition in which the difference parameter is not more than the first threshold value, the difference parameter indicating a difference between a highest one of and a second highest one of the reliability values obtained by the reliability determining section; and a display control section which divides document images, that are determined to satisfy the first condition or the second condition into groups so that document images, having a same direction whose reliability value is the highest, belong to a same group, and which causes the display device to display preview images for the respective groups.

According to the arrangement, in a case where a plurality of document images are processed, the image processing apparatus can precisely recognize page orientation of an information image of a document image whose largest reliability value is larger than the first threshold value and in which a difference parameter is larger than the second threshold value. Note that the difference parameter indicates a difference between the largest reliability value of and the second largest reliability of the reliability values. With respect to such a document image, the image processing apparatus can automatically carry out processing according to the direction having the largest reliability value, for example. The processing according to the direction having the largest reliability value is, for example, rotation processing carried out so that the direction having the largest reliability value coincides with a predetermined direction. Further, such processing may be carried out by another processing apparatus (e.g. server) which is connected to the image processing apparatus and receives the image data, a judged result, and the like. With the arrangement, it is possible to spare a user the trouble of carrying out processing with respect to document images in which a direction having the highest reliability highly likely coincides with the first reference direction. Further, document images whose largest reliability value is not more than the first threshold value and in which the difference parameter is not more than the second threshold value are divided into groups so that a document image(s), having the same direction whose reliability is the highest, belong to the same group, and a preview image is displayed for each of the groups. This allows a user to check a smaller number of document images, and therefore allows the user to easily check a plurality of document images shown in a preview image. Further, since the user checks the document images whose largest reliability value is not more than the first threshold value and in which the difference parameter is not more than the second threshold value, a problem that incorrect processing is automatically carried out with respect to the document images can be avoided.

Further, the image processing apparatus of the present invention may further include a processing section which carries out, based on an processing instruction accepted while one of the preview images is being displayed, predetermined processing with respect to at least one document image shown in said one of the preview images.

According to the arrangement, after checking a preview image, a user can carry out processing such as rotation processing or printing with respect to a desired document image.

Further, the image processing apparatus of the present invention may be arranged such that the display control section creates image selection markers for the respective plurality of document images, the image selection markers being created for selecting the respective document images, the preview images each showing document images contained therein and image selection markers corresponding to the respective document images, and the processing section accepts an instruction to select at least one of the image selection markers, and carries out, based on the processing instruction, same processing with respect to a document image(s) corresponding to said at least one of the image selection markers in a case where the processing section receives (i) the instruction to select said at least one of the image selection markers and (ii) the processing instruction.

According to the arrangement, after checking a preview image, a user can easily carry out the same processing with respect to a plurality of desired document images. This saves labor and time for the user.

Further, the image processing apparatus of the present invention may be arranged such that each of the preview images shows at least one document image and at least one corresponding image selection marker which are superimposed.

According to the arrangement, a user can easily select a document image while checking a preview image.

Further, the image processing apparatus of the present invention may be arranged such that the processing instruction is a rotation instruction to rotate a document image, and the processing section carries out, based on the rotation instruction, rotation processing with respect to the document image.

Further, the image processing apparatus of the present invention may be arranged such that the processing instruction is a rotation instruction to rotate the at least one document image in a specified direction which is any one of the predetermined directions, and the processing section carries out, based on the rotation instruction, rotation processing with respect to the document images so that the at least one document image is rotated at an angle defined by the specified direction and a second reference direction which is a predetermined direction which points on a basis of an upward direction of or a downward direction of the document images, and which is same for the document images.

According to the arrangement, a user can carry out rotation processing with respect to a plurality of document images having different first reference directions so that the plurality of document images can have the same first reference direction.

Further, the image processing apparatus of the present invention may be arranged such that the display device includes a touch panel via which a user can select one of the image selection markers.

According to the arrangement, a user can select an image selection marker of a document image shown in a preview image by touching the touch panel. This allows the user to easily select a document image.

Further, the image processing apparatus of the present invention may be arranged such that the display control section creates, for each of the plurality of document images, direction recognition markers indicating the respective predetermined directions of the document images, each of the direction recognition markers being displayed in accordance with its reliability of a corresponding one of the predetermined directions, and causes the display device to display the preview images which shows at least one document image and corresponding direction recognition markers which are superimposed.

Further, the image processing apparatus of the present invention may be arranged such that the display control section creates, for each of the plurality of document images, direction recognition markers indicating the respective predetermined directions of the document images, each of the direction recognition markers being displayed in accordance with its reliability of a corresponding one of the predetermined directions, and causes the display device to display the preview images which shows at least one document image and corresponding direction recognition markers which are superimposed, and the processing section accepts, as the processing instruction, an instruction to select one of the direction recognition markers, and sets, as the specified direction, a direction corresponding to the one of direction recognition marker.

According to the arrangement, in which the direction recognition markers are displayed in respective different ways in accordance with the reliability, a user can easily find a direction having high reliability, i.e., the first reference direction of each of the document images even if the size of a preview image is small.

Further, the image processing apparatus of the present invention may be arranged such that the display control section determines color of each of the direction recognition markers in accordance with the reliability of the corresponding one of the predetermined directions.

Further, the image processing apparatus of the present invention may be arranged such that the display control section determines size of each of the direction recognition markers in accordance with the reliability of the corresponding one of the predetermined directions.

According to the arrangement, in which the direction recognition markers are displayed in respective different ways by changing their color or size in accordance with the reliability, a user can easily find a direction having high reliability, i.e., the first reference direction of each of the document images even if the size of a preview image is small.

Further, the image processing apparatus of the present invention may be provided in an image forming apparatus, or may be provided in an image reading apparatus.

Further, the image processing apparatus of the present invention may be realized by a computer. In this case, the present invention includes a control program for causing a computer to function as each section of the image processing apparatus, and a computer-readable recording medium in which the control program is stored.

Further, a method of the present invention for controlling an image processing apparatus for processing a plurality of document images contained in inputted image data, includes the steps of: determining, with respect to each of the plurality of document images, reliability of coincidences of respective predetermined directions with a first reference direction, the first reference direction being a predetermined direction which points on a basis of an upward direction of or a downward direction of the information image; and dividing the plurality of document images into groups so that document images, having a same direction whose reliability value is the highest, belong to a same group, and causing a display device to display preview images for the respective groups, each of the preview images indicating at least one document image in each of the groups.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

An image processing apparatus of the present invention can be suitably applied to an apparatus for processing image data read out from a document. Further, this image processing apparatus can be applied to a multifunction printer, a copying machine, a scanner device, a facsimile apparatus, and a terminal device. Further, the image processing apparatus of the present invention can be used as an apparatus (e.g. computer apparatus) for processing image data inputted by network or the like.

Reference Signs List

- 10: Image processing apparatus
- 11: Display device
- 12: Storage section
- 13: Control section
- 21: Reliability determining section
- 22: Display control section
- 23: Rotation processing section (processing section)
- 100: Image forming apparatus
- 103a: Image output apparatus
- 200: Image reading apparatus
- 300: Document image
- 301: Information image
- 311 Document image (thumbnail image of a document image)
- 400, 410a through 410d: Preview image
- 501 through 504, 511 through 514: Instruction mark (direction recognition marker)
- 700, 711: Selection mark (Image selection marker)

The invention claimed is:

1. An image processing apparatus for processing a plurality of document images contained in inputted image data, each of the plurality of document images containing an information image which provides a user with information, said image processing apparatus, comprising:

a reliability determining section which determines, with respect to each of the plurality of document images, reliability values corresponding to reliability of coincidences of respective predetermined directions with a first reference direction, the first reference direction being a predetermined direction which points on a basis of an upward direction of or a downward direction of the information image; and a display control section (i) which divides the plurality of document images into groups so that document images, having a same direction whose reliability value is the highest, belong to a same group, and (ii) which causes a display device to display preview images for the respective groups, each of the preview images indicating at least one document image in each of the groups.

2. The image processing apparatus according to claim 1, further comprising a judging section which compares a highest one of the reliability values of the respective directions with a first threshold value so as to determine whether or not each of the plurality of document images satisfies a first condition in which the highest reliability value is smaller than the first threshold value, the reliability values being obtained by the reliability determining section, the display control section dividing document images, that are determined to satisfy the first condition, into groups so that document images, having a same direction whose reliability value is the highest, belong to a same group, and causing the display device to display preview images for the respective groups.

3. The image processing apparatus according to claim 1, further comprising a judging section which compares a difference parameter with a second threshold value so as to determine whether or not each of the plurality of document images satisfies a second condition in which the difference parameter is not more than the second threshold value, the difference parameter indicating a difference between a highest one of and a second highest one of the reliability values obtained by the reliability determining section, the display control section dividing document images, that are determined to satisfy the second condition, into groups so that document images, having a same direction whose reliability value is the highest, belong to a same group, and causing the display device to display preview images for the respective groups.

4. The image processing apparatus according to claim 1, further comprising a judging section (i) which compares a highest one of the reliability values of the respective directions with a first threshold value so as to determine whether or not each of the plurality of document images satisfies a first condition in which the highest reliability value is smaller than the first threshold value, the reliability values being obtained by the reliability determining section, and (ii) which compares a difference parameter with a second threshold value so as to determine whether or not each of the plurality of document images satisfies a second condition in which the difference parameter is not more than the second threshold value, the difference parameter indicating a difference between a highest one of and a second highest one of the reliability values obtained by the reliability determining section, the display control section dividing document images, that are determined to satisfy the first condition or the second condition into groups so that document images, having a same direction whose reliability value is the highest, belong to a same group, and causing the display device to display preview images for the respective groups.

5. The image processing apparatus according to claim 1, further comprising:

a processing section which carries out, based on a processing instruction accepted while one of the preview images is being displayed, predetermined processing with respect to at least one document image shown in one of the preview images.

6. The image processing apparatus according to claim 5, wherein:

the display control section creates image selection markers for a respective plurality of document images, the image selection markers being created for selecting the respective document images, the preview images each showing document images contained therein and image selection markers corresponding to the respective document images, and the processing section accepts an instruction to select at least one of the image selection markers, and carries out, based on the processing instruction, same processing with respect to a document image(s) corresponding to at least one of the image selection markers in a case where the processing section receives (i) the instruction to select said at least one of the image selection markers and (ii) the processing instruction.

7. The image processing apparatus according to claim 6, wherein:

each of the preview images shows at least one document image and at least one corresponding image selection marker which are superimposed.

8. The image processing apparatus according to claim 5, wherein the processing instruction is a rotation instruction to rotate a document image, and the processing section carries out, based on the rotation instruction, rotation processing with respect to the document image.

9. The image processing apparatus according to claim 5, wherein the processing instruction is a rotation instruction to rotate the at least one document image in a specified direction which is any one of the predetermined directions, and the processing section carries out, based on the rotation instruction, rotation processing with respect to the document images so that the at least one document image is rotated at an angle defined by the specified direction and a second reference direction which is a predetermined direction which points on a basis of an upward direction of or a downward direction of the document images, and which is same for the document images.

10. The image processing apparatus according to claim 6, wherein the display device includes a touch panel via which a user can select one of the image selection markers.

11. The image processing apparatus according to claim 1, wherein the display control section creates, for each of the plurality of document images, direction recognition markers indicating the respective predetermined directions of the document images, each of the direction recognition markers being displayed in accordance with its reliability of a corresponding one of the predetermined directions, and causes the display device to display the preview images which shows at least one document image and corresponding direction recognition markers which are superimposed.

12. The image processing apparatus according to claim 9, wherein the display control section creates, for each of the plurality of document images, direction recognition markers indicating the respective predetermined directions of the document images, each of the direction recognition markers being displayed in accordance with its reliability of a corresponding one of the predetermined directions, and causes the display device to display the preview images which shows at least one document image and corresponding direction recognition markers which are superimposed, and the processing section accepts, as the processing instruction, an instruction to select one of the direction recognition markers, and sets, as the specified direction, a direction corresponding to the one of the direction recognition marker selected.

13. The image processing apparatus according to claim 11, wherein the display control section determines at least one of color and size of each of the direction recognition markers in accordance with the reliability of the corresponding one of the predetermined directions.

14. The image processing apparatus according to claim 12, wherein the display control section determines at least one of color and size of each of the direction recognition markers in accordance with the reliability of the corresponding one of the predetermined directions.

15. A non-transitory computer-readable storage medium for storing computer-executable instructions for controlling the image processing apparatus recited in claim 1, and for causing a computer to function as the image processing apparatus.

16. An image forming apparatus comprising an image processing apparatus for processing a plurality of document images contained in inputted image data, each of the plurality of document images containing an information image which provides a user with information, the image processing apparatus comprising:

a reliability determining section which determines, with respect to each of the plurality of document images, reliability values corresponding to reliability of coincidences of respective predetermined directions with a first reference direction, the first reference direction being a predetermined direction which points on a basis of an upward direction of or a downward direction of the information image; and a display control section (i) which divides the plurality of document images into groups so that document images, having a same direction whose reliability value is the highest, belong to a same group, and (ii) which causes a display device to display preview images for the respective groups, each of the preview images indicating at least one document image in each of the groups.

17. A method for controlling an image processing apparatus for processing a plurality of document images contained in inputted image data, each of the plurality of document images containing an information image which provides a user with information, comprising the steps of:

determining, with respect to each of the plurality of document images, reliability values corresponding to reliability of coincidences of respective predetermined directions with a first reference direction, the first reference direction being a predetermined direction which points on a basis of an upward direction of or a downward direction of the information image; and dividing the plurality of document images into groups so that document images, having a same direction whose reliability value is the highest, belong to a same group, and causing a display device to display preview images for the respective groups, each of the preview images indicating at least one document image in each of the groups.

* * * * *